(12) United States Patent
Kosseifi et al.

(10) Patent No.: US 8,762,048 B2
(45) Date of Patent: Jun. 24, 2014

(54) AUTOMATIC TRAVEL TIME AND ROUTING DETERMINATIONS IN A WIRELESS NETWORK

(75) Inventors: Mario Kosseifi, Roswell, GA (US); Brandon Hilliard, Woodstock, GA (US); Sheldon Meredith, Marietta, GA (US); Mark Austin, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 135 days.

(21) Appl. No.: 13/284,456

(22) Filed: Oct. 28, 2011

(65) Prior Publication Data

US 2013/0110392 A1    May 2, 2013

(51) Int. Cl.
*G01C 21/36*    (2006.01)

(52) U.S. Cl.
USPC .......................................... 701/410; 701/465

(58) Field of Classification Search
USPC .......................................... 701/410, 465, 533
See application file for complete search history.

(56) References Cited

U.S. PATENT DOCUMENTS

| | | | |
|---|---|---|---|
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth |
| 6,108,532 A | 8/2000 | Matsuda et al. |
| 6,108,556 A | 8/2000 | Ito |
| 6,148,219 A | 11/2000 | Engelbrecht et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,311,078 B1 | 10/2001 | Hardouin et al. |
| 6,317,686 B1 * | 11/2001 | Ran ............................. 701/533 |
| 6,353,778 B1 | 3/2002 | Brown et al. |

(Continued)

FOREIGN PATENT DOCUMENTS

| | | | | |
|---|---|---|---|---|
| EP | 0856746 A2 | 8/1998 | | |
| JP | 2004069609 A | * | 3/2004 | ............. G01C 21/00 |
| JP | 2007328050 A | * | 12/2007 | |
| WO | 2006031035 A1 | 3/2006 | | |

OTHER PUBLICATIONS

RouteFinder 3.00 for ArcGIS Documentation, © 2007 Routeware and Higher Mapping Solutions, 71 pages, downloaded from http://www.routeware.dk/download/routefinder_arcgis.pdf.*

(Continued)

*Primary Examiner* — Behrang Badii
*Assistant Examiner* — David Testardi
(74) *Attorney, Agent, or Firm* — Amin, Turocy & Watson, LLP

(57) ABSTRACT

Aspects relate to automatically providing updated route and predicted travel time to allow a user to travel a shortest route between a first point and a second point. A route can be planned based on a multitude of route segments, wherein historical data related to speed is known for each of the route segments. Further, the historical data is categorized based on temporal aspects, such as time of day, day of week, as well as other aspects, such as known events that can have an influence on the speed at which each route segment can be traveled. As the user moves along the route, the planned route, as well as an anticipated travel time, are almost continually updated to provide the most up-to-date and accurate data.

20 Claims, 14 Drawing Sheets

(56) References Cited

U.S. PATENT DOCUMENTS

| | | | |
|---|---|---|---|
| 6,397,074 B1 | 5/2002 | Pihl et al. | |
| 6,407,703 B1 | 6/2002 | Minter et al. | |
| 6,429,815 B1 | 8/2002 | Soliman | |
| 6,453,168 B1 | 9/2002 | McCrady et al. | |
| 6,526,335 B1 | 2/2003 | Treyz et al. | |
| 6,560,532 B2 | 5/2003 | Cayford | |
| 6,594,576 B2 | 7/2003 | Fan et al. | |
| 6,604,083 B1* | 8/2003 | Bailey | 705/7.34 |
| 6,668,226 B2* | 12/2003 | Sutanto | 701/409 |
| 6,690,292 B1 | 2/2004 | Meadows et al. | |
| 6,744,383 B1 | 6/2004 | Alfred et al. | |
| 6,744,740 B2 | 6/2004 | Chen | |
| 6,801,782 B2 | 10/2004 | McCrady et al. | |
| 6,801,855 B1 | 10/2004 | Walters et al. | |
| 6,816,782 B1 | 11/2004 | Walters et al. | |
| 6,933,100 B2 | 8/2005 | Igawa et al. | |
| 6,933,860 B1* | 8/2005 | Gehman | 340/995.1 |
| 7,065,349 B1 | 6/2006 | Nath et al. | |
| 7,098,805 B2 | 8/2006 | Meadows et al. | |
| 7,149,534 B2 | 12/2006 | Bloebaum et al. | |
| 7,181,218 B2 | 2/2007 | Ovesjo et al. | |
| 7,277,049 B2 | 10/2007 | Korneluk et al. | |
| 7,289,039 B2 | 10/2007 | Kato et al. | |
| 7,366,492 B1 | 4/2008 | Ganesh | |
| 7,375,649 B2 | 5/2008 | Gueziec | |
| 7,432,829 B2 | 10/2008 | Poltorak | |
| 7,508,321 B2 | 3/2009 | Gueziec | |
| 7,697,917 B2 | 4/2010 | Camp et al. | |
| 7,706,964 B2 | 4/2010 | Horvitz et al. | |
| 7,744,740 B2 | 6/2010 | Diehl | |
| 7,761,225 B2 | 7/2010 | Vaughn | |
| 7,831,380 B2 | 11/2010 | Chapman et al. | |
| 7,848,880 B2 | 12/2010 | Cheung | |
| 7,945,271 B1 | 5/2011 | Barnes et al. | |
| 7,962,162 B2 | 6/2011 | McNair | |
| 7,962,280 B2* | 6/2011 | Kindo et al. | 701/439 |
| 7,994,981 B1 | 8/2011 | Farrokhi et al. | |
| 8,036,822 B2* | 10/2011 | Ho | 701/465 |
| 8,194,589 B2 | 6/2012 | Wynn et al. | |
| 8,195,175 B2 | 6/2012 | Govindan et al. | |
| 8,254,959 B2 | 8/2012 | Fix et al. | |
| 8,270,933 B2 | 9/2012 | Riemer et al. | |
| 8,280,438 B2 | 10/2012 | Barbera et al. | |
| 8,295,854 B2 | 10/2012 | Osann et al. | |
| 8,355,865 B2* | 1/2013 | Wagner et al. | 701/465 |
| 2001/0047242 A1 | 11/2001 | Ohta | |
| 2002/0059266 A1 | 5/2002 | I'anson et al. | |
| 2002/0077116 A1 | 6/2002 | Havinis et al. | |
| 2003/0097330 A1 | 5/2003 | Hillmer et al. | |
| 2003/0115260 A1 | 6/2003 | Edge | |
| 2003/0222819 A1 | 12/2003 | Karr et al. | |
| 2003/0225508 A9* | 12/2003 | Petzold et al. | 701/201 |
| 2004/0127191 A1 | 7/2004 | Matsunaga | |
| 2004/0131036 A1 | 7/2004 | Walsh | |
| 2004/0155814 A1 | 8/2004 | Bascobert | |
| 2004/0224698 A1 | 11/2004 | Yi et al. | |
| 2005/0039056 A1 | 2/2005 | Bagga et al. | |
| 2005/0053099 A1 | 3/2005 | Spear et al. | |
| 2005/0136911 A1 | 6/2005 | Csapo et al. | |
| 2005/0272445 A1 | 12/2005 | Zellner | |
| 2006/0046744 A1 | 3/2006 | Dublish et al. | |
| 2006/0075131 A1 | 4/2006 | Douglas et al. | |
| 2006/0089153 A1 | 4/2006 | Sheynblat | |
| 2006/0282660 A1 | 12/2006 | Varghese et al. | |
| 2007/0001873 A1* | 1/2007 | Ishikawa | 340/994 |
| 2007/0060130 A1 | 3/2007 | Gogic et al. | |
| 2007/0217375 A1 | 9/2007 | Zampiello et al. | |
| 2007/0217379 A1 | 9/2007 | Fujiwara et al. | |
| 2007/0293157 A1 | 12/2007 | Haartsen et al. | |
| 2008/0004789 A1 | 1/2008 | Horvitz et al. | |
| 2008/0071466 A1 | 3/2008 | Downs et al. | |
| 2008/0076450 A1 | 3/2008 | Nanda et al. | |
| 2008/0096566 A1 | 4/2008 | Brunner et al. | |
| 2008/0133730 A1 | 6/2008 | Park et al. | |
| 2008/0186234 A1 | 8/2008 | Alles et al. | |
| 2008/0274750 A1 | 11/2008 | Carlson et al. | |
| 2008/0311923 A1 | 12/2008 | Petrovic et al. | |
| 2009/0024546 A1 | 1/2009 | Ficcaglia et al. | |
| 2009/0052330 A1 | 2/2009 | Matsunaga et al. | |
| 2009/0079622 A1 | 3/2009 | Seshadri et al. | |
| 2009/0104917 A1 | 4/2009 | Ben Rached et al. | |
| 2009/0117907 A1 | 5/2009 | Wigren et al. | |
| 2009/0181695 A1 | 7/2009 | Wirola et al. | |
| 2009/0280828 A1 | 11/2009 | Wang et al. | |
| 2009/0287922 A1 | 11/2009 | Herwono et al. | |
| 2009/0310501 A1 | 12/2009 | Catovic et al. | |
| 2009/0327134 A1 | 12/2009 | Carlson et al. | |
| 2010/0058442 A1 | 3/2010 | Costa et al. | |
| 2010/0100732 A1 | 4/2010 | Hatakeyama et al. | |
| 2010/0159951 A1 | 6/2010 | Shkedi et al. | |
| 2010/0189236 A1 | 7/2010 | MacDonald et al. | |
| 2010/0190509 A1 | 7/2010 | Davis et al. | |
| 2010/0203903 A1 | 8/2010 | Dingler et al. | |
| 2010/0207470 A1 | 8/2010 | Kim et al. | |
| 2010/0220665 A1 | 9/2010 | Govindan et al. | |
| 2010/0250542 A1 | 9/2010 | Fujimaki | |
| 2010/0299060 A1 | 11/2010 | Snavely et al. | |
| 2011/0010085 A1* | 1/2011 | Tanaka | 701/201 |
| 2011/0060808 A1 | 3/2011 | Martin et al. | |
| 2011/0076975 A1 | 3/2011 | Kim et al. | |
| 2011/0077032 A1 | 3/2011 | Correale et al. | |
| 2011/0161261 A1* | 6/2011 | Wu et al. | 706/12 |
| 2011/0164596 A1 | 7/2011 | Montemurro et al. | |
| 2011/0172905 A1* | 7/2011 | Schroder et al. | 701/201 |
| 2011/0207470 A1 | 8/2011 | Meredith et al. | |
| 2011/0244879 A1 | 10/2011 | Siomina et al. | |
| 2011/0271331 A1 | 11/2011 | Adams | |
| 2012/0028650 A1 | 2/2012 | Cooper et al. | |
| 2012/0030083 A1 | 2/2012 | Newman et al. | |
| 2012/0062415 A1 | 3/2012 | Hwang et al. | |
| 2012/0139782 A1 | 6/2012 | Gutt et al. | |
| 2012/0158289 A1 | 6/2012 | Bernheim Brush et al. | |
| 2012/0323703 A1 | 12/2012 | Hillier et al. | |
| 2013/0007058 A1 | 1/2013 | Meredith et al. | |
| 2013/0023237 A1 | 1/2013 | Meredith et al. | |
| 2013/0023274 A1 | 1/2013 | Meredith et al. | |
| 2013/0023281 A1 | 1/2013 | Meredith et al. | |

OTHER PUBLICATIONS mySociety (Web page), "More travel-time maps and their uses", 2007, downloaded from http://www.mysociety.org/2007/more-travel-maps/ , 10 pages total (including a single page Examiner's attachment showing the operation of the interactive travel-time map).*

Wayback machine archive from Jan. 21, 2009 of the mySociety Web page, "More travel time maps and their uses", downloaded from http://web.archive.org/web/20090121193615/http://www.mysociety.org/2007/more-travel-maps/ , 11 pages.*

Street, Nicholas, "TimeContours: Using isochrone visualisation to describe transport network travel cost", Final Report, Jun. 14, 2006, Department of Computing Imperial College London, 97 pages, downloaded from http://www.doc.ic.ac.uk/teaching/projects/Distinguished06/nicholasstreet.pdf.*

International Search Report for PCT Application No. US2011/026122 dated Sep. 10, 2011, 11 pages, (mailed Jun. 10, 2011).

International Search Report for PCT Application No. US2011/026120 dated Sep. 9, 2011 13 pages, (mailed Jun. 9, 2011).

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010, 5 pages.

"Location Based Fraud Detection", Finsphere Corporation, 2008-2010, 4 pages, (Copyright 2008-2010).

(56) References Cited

OTHER PUBLICATIONS

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last accessed Dec. 24, 2010, 7 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6), (Published 2005).

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6), (Published 2006).

Suykens et al., "Least squares support vector machine classifiers", Neural Processing Letters, vol. 9, No. 3, Jun. 1999, pp. 293-300.

Ferris et al. (2002). "Interior-point methods for massive support vector machines". SIAM Journal on Optimization 13:783-804. doi:10.1137/S1052623400374379.

Meyer et al. "The support vector machine under test." Neurocomputing 55(1-2): 169-186, 2003.

Fleishman. Using the Personal Hotspot on your AT & T iPhone. Published online Mar. 15, 2011. http://www.macworld.com/article/158556/2011/03/personal_hotspot_att . . . , 4 pages.

Fleischfresser. Never Stop at a Red-Light Again. Published online Aug. 30, 2011. http://www.smartplanet.com/blog/ . . . , 2 pages.

Cellphone Networks and the Future of Traffic. Published online Mar. 2, 2011. http://m.wired.com/autopia/2011/03/cell-phone-networks-and-the-future- . . . 15 pages.

Intelligent Transportation System. Published online http://en.wikipedia.org/wiki/Intelligent_transportation_system, 7 pages, (retrieved Aug. 15, 2011).

Koukoumidis Emmanouil, Peh Li-Shiuan, Martonosi Margaret, SignalGuru: Leveraging Mobile Phones for Collaborative Traffic Signal Schedule Advisory. 14 pages, (Published 2011).

Bitcarrier Technology. Published online at http://www.bitcarrier.com/technology. 1 page, (retrieved Aug. 15, 2011).

Hao Peng, Ban Xuegang(Jeff). Estimating Vehicle Position in a Queue at Signalized Intersections Using Simple Travel Times from Mobile Sensors. 6 pages, (undated, submitted Nov. 21, 2011).

Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.

OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Mar. 19, 2013, for U.S. Appl. No. 13/284,497, 46 pages.
Non-Final Office Action dated Apr. 19, 2013, for U.S. Appl. No. 13/277,595, 58 pages.
OA dated Apr. 13, 2012 for U.S. Appl. No. 12/416,853, 36 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 7, 2012 for U.S. Appl. No. 13/220,083, 57 pages.
OA dated Sep. 11, 2012 for U.S. Appl. No. 13/188,345, 44 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Office Action dated Dec. 15, 2011 for U.S. Appl. No. 12/712,424, 34 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
3rd Generation Partnership Project, Technical Specification, "Group GSM/EDGE Radio Access Network, Radio subsystem synchronization (Release 8)", 3GPP TS 45.010, last viewed Jul. 1, 2009, 31 pages, (V8.4.0, May 2009).
3rd Generation Partnership Project, Technical Specification, "Group Radio Access Network, UTRAM Iuh interface Node B Application Part (NBAP) signalling (Release 8)", 3GPP TS 25.469 V8.0.0 (Dec. 2008).
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.

(56) References Cited

OTHER PUBLICATIONS

Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Final Office Action dated Feb. 24, 2014, for U.S. Appl. No. 13/927,020, 18 pages.

* cited by examiner

AUTOMATIC TRAVEL TIME AND ROUTING DETERMINATIONS IN A WIRELESS NETWORK

REFERENCE TO RELATED APPLICATIONS

The subject application for patent is related to co-pending U.S. application Ser. No. 12/712,424 entitled "TIMED FINGERPRINT LOCATION IN WIRELESS NETWORKS" and filed Feb. 25, 2010, which is assigned to the assignee hereof and hereby expressly incorporated by reference herein.

TECHNICAL FIELD

The subject disclosure relates to wireless communications and, more particularly, to automatic travel time and routing determinations of mobile equipment in a wireless network environment.

BACKGROUND

In mobile equipment networks, locating user equipments can provide valuable benefits to users and opportunities for additional or improved services. Typical mobile equipment networks provide wireless access to various communications services. Such communications services include voice, video, data, messaging, content broadcast, Voice over Internet Protocol (VoIP), and so forth. Wireless networks types can include Universal Mobile Telecommunications System (UMTS), Long Term Evolution (LTE), High Speed Packet Access (HSPA), Code Division Multiple Access (CDMA), Time Division Multiple Access (TDMA), Frequency Division Multiple Access (FDMA), Multi-Carrier Code Division Multiple Access (MC-CDMA), Single-Carrier Code Division Multiple Access (SC-CDMA), Orthogonal Frequency Division Multiple Access (OFDMA), Single-carrier FDMA (SC-FDMA), and others.

Mobile equipment networks can also provide access to mapping applications, which can be utilized to find travel routes from a defined start location to a defined end location. The mapping application can also provide other information, such as estimated travel time and/or alternative routes. In an example, a person might be relocating and knows their work address but is not sure where to live. Through interaction with the mapping application, the person can determine potential places to live based on a distance that will need to be traveled between home and work. Thus, through utilization of the mapping application, the person can locate potential places to buy a home or rent an apartment based on the distance.

Traditional mapping applications or navigations systems provide routing information based on either posted speed limits or current traffic conditions. However, routing may be requested over large distances taking many hours or days to traverse. As such, the current traffic conditions on distant segments are irrelevant because such conditions will have changed by the time the segment is reached. Further, if routing is performed during off peak hours, the recommended routing, using current traffic conditions, will reflect low traffic density and high speed in an area where the opposite might be true when actually reaching that segment.

The above-described deficiencies of today's wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of example, non-limiting embodiments that follow in the more detailed description and the accompanying drawings. This summary is not intended, however, as an extensive or exhaustive overview. Instead, the sole purpose of this summary is to present some concepts related to some example, non-limiting embodiments in a simplified form as a prelude to the more detailed description of the various embodiments that follow. It will also be appreciated that the detailed description may include additional or alternative embodiments beyond those described in this summary.

In an example embodiment, a method can include obtaining a first location and receiving a travel time target that represents an amount of time to be traveled in relation to the first location. The method can also include calculating alternative routes as a function of the first location and the travel time target. Each alternative route can be divided into route segments and the calculation can be based on the route segments and historical information associated with each of the route segments. The method can also include deriving alternative second locations based on the alternative routes and rendering, on a user device, a map that comprises the alternative second locations.

In another example embodiment, a computer-readable storage medium comprising computer-executable instructions stored therein that, in response to execution, cause a computing system to perform operations, comprising collecting location information of a mobile device and collecting speed information of the mobile device. The operations can also include creating a vector based on a combination of the location information and the speed information. The operations can also include retaining the vector as historical data and providing access to a mapping application. The operations can also include utilizing the vector and the mapping application to determine an estimated travel time with respect to a defined location.

A further example embodiment relates to a method that can include receiving from a user device a route request that includes a start location and a destination location. The method can also include planning a route based on a plurality of route segments located between the start location and the destination location and associating real-time information with a first set of the plurality of route segments and historical information with a second set of the plurality of route segments. The method can also include calculating a travel time for the route as a function of the associating and pushing to the user device the route and the calculated travel time. Further, the method can include monitoring a device location as the user device moves within the first set of the plurality of route segments. Based on the monitoring, the second set of the plurality of route segments can be updated with real-time information and the real-time information for the second set of the plurality of route segments can be sent to the user device for consumption by the user.

These and other embodiments are described in more detail below.

BRIEF DESCRIPTION OF THE DRAWINGS

Various non-limiting embodiments are further described with reference to the accompanying drawings in which.

DETAILED DESCRIPTION

Figure 1:
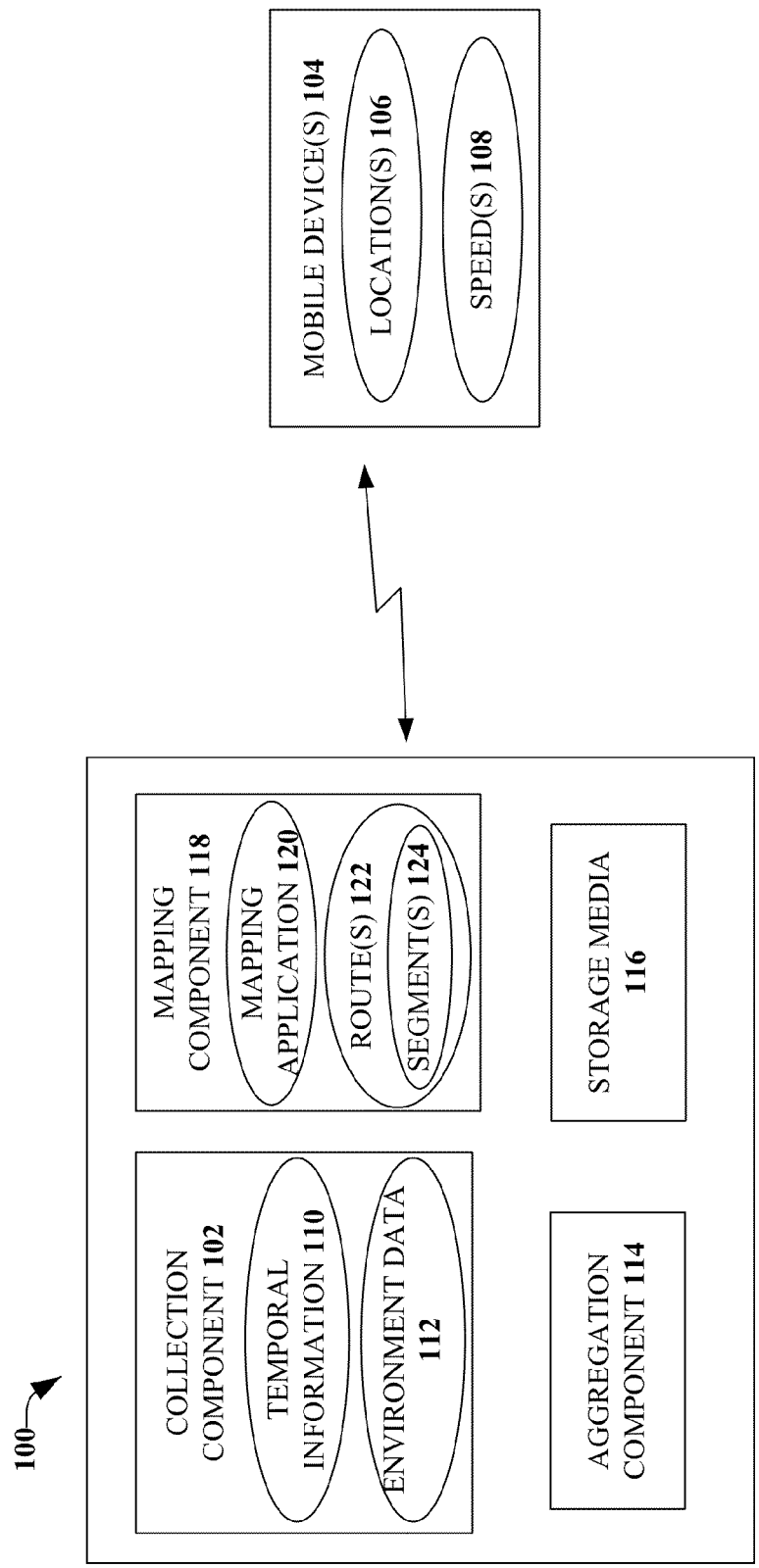
FIG. 1 illustrates an example, non-limiting system that facilitates automatic travel time and routing determinations in a wireless network.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein. Like numbers refer to like elements throughout.

Various embodiments can be configured to continuously collect mobile location and speed, which can be utilized to provide dynamic travel time and routing determinations. An aspect relates to a situation where a person might desire to know how long it will take to travel to a specific destination in order to arrive at the destination at a certain time. For example, a person (sometimes referred to as user or subscriber) might desire to estimate how long it would take to travel to a specific destination from many different starting locations and arrive at the destination at a defined time. A non-limiting example is the case of a person relocating to a new city. The person knows their work address and their starting time and wants to know for many potential starting locations, how long it would take to arrive at work on time. To ascertain various start locations, historical information can be accessed and the historical information utilized to provide one or more results. These results may be visualized as a map where each "bin" on the map is color coded (or identified in another manner) to reflect how long it would take, starting in that bin, to arrive at the destination on time.

In order to provide the requested information, historical vectors over a very wide area and with sufficient location accuracy to associate the location data with specific streets can be provided. The data should be sufficiently refined in time to be meaningful to computation of nominal travel time over distances typical for commuters.

For example, if a typical commute time would be 30-60 minutes, temporal historic vectors would be refined to no more than 15 minute intervals (or another interval). Having street-driven information, such as a street map, locations of stop lights, posted traffic speed, and so forth, in conjunction with vectors allows the disclosed aspects to begin the analysis at the destination and at the specified arrival time. From the end location and time, the disclosed aspects can look up the road segments connecting to the end point along with the nominal speeds of the road segments at the indicated time of day and compute transmit time over various segments of road. The statistical information from historical vectors can be used to establish a mean transmit time for each road segment and a confidence interval about the mean. From the starting points of each of these street segments (called point set A), the computation further looks at all streets ending on the points of point set A. The same type of calculations can be performed to estimate the required travel time at that time of day for another tier of road segments with starting points called point set B. This process continues until the shortest total travel time between the queried set of geographic locations and the destination point are estimated.

Further, each segment along each travel route can be assigned a confidence interval for transit time. These confidence intervals can also be used to compute statistical variance for each traveled route. The result of the computation is a dataset that can be visualized to provide the user the results in a variety of manners. One non-limiting example is to show travel time averages and another non-limiting example would be to show expected travel time with 90% confidence. The difference here could be that certain types of workers have very little flexibility on their start time. Arriving at a destination at a certain time on average may be less important than having a 90% confidence of getting there on time. Therefore, a graphical user interface (or other means for interfacing with a user) can allow the user to enter the required destination, arrival time, required confidence, and geographic search area for which results are returned.

Various other embodiments can be configured to utilize both real time and historical location information to determine and predict traffic metrics on various road segments. The segments can be identified as existing between traffic lights, highway exits, or other known location markers. Data related to subscriber speed, as a function of time per segment, is collected and used to route vehicles. Such routing is not only based upon current traffic conditions, but also based on traffic conditions predicted to exist at the time the vehicle is expected to be present on various segments of the route. As the user progresses along the route, there are constant (or nearly constant) updates based on traveling the length of a road segment (or portion thereof), changes in real-time information (received from the particular mobile device or other devices and/or sensors), or based on other data (e.g., unplanned stops, road congestion on another road segment has been cleared up and traveling that road segment would result in a shorter travel time, and so forth).

Another aspect relates to aggregating location data and speed for multiple subscribers. The location data and speed can be aggregated periodically per segment. In the absence of any mobile subscriber speed data during a specific time interval, the minimum legal transit time may be used. These data can be used to compute basic statistics such as mean and standard deviation, which in turn can be used not only for optimal routing but also to show the statistics of expected travel durations. For example, a computation for an offered route may provide an average expected travel time of 10 hours with a 90% confidence of arrival within 12 hours while another offered route may show an average expected transit duration of 10.5 hours with a 90% confidence of arriving within 11 hours. The latter may be a preferred routing option.

Some roads are notorious for traffic accidents and resulting traffic jams which can cause spikes in traffic statistics. Historical trending on these spikes can be utilized to effectively advise a user of the risks associated with traversing an offered route.

Aspects or features of the disclosed aspects can be exploited in substantially any wireless communication technology; e.g., Universal Mobile Telecommunications System (UMTS), Code division multiple access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Referring initially to FIG. 1, illustrated is an example, non-limiting system 100 that facilitates automatic travel time and routing determinations in a wireless network. In an aspect, system 100 can be a part of a mobile network, and can reside at least in part within at least one of a network management component (e.g., radio network controller, core network, or network gateway) or a base station or access point.

Included in system 100 is a collection component 102 that can be configured to obtain information related to mobile location(s) and travel speed(s). For example, collection component 102 can interface with various mobile devices 104, wherein each device reports its respective location (e.g., location information 106) and speed (e.g., speed information 108). For example, the location information 106 can be described as a geographic coordinate, a vector, or some other means on conveying location information. The reported speed information 108 is the current speed of the vehicle at the moment when the speed information 108 is reported (or prepared to be reported). The speed information 108 can be the legal speed limit, lower than the legal speed limit, or higher than the legal speed limit.

The location information 106 and speed information 108 can be obtained by collection component 102 over a period of time (e.g., hours, days, weeks, and so forth). In some aspects, the information is collected every few seconds or minutes. Further, the information can be collected during different sessions or during the same session, where a session refers to a period of time between when a vehicle engine is started to when the vehicle engine is stopped or turned off. In accordance with some aspects, the information is only obtained from users (e.g., subscribers associated with respective mobile devices 104) that have authorized the collection of information (e.g., subscribed to the service).

The information obtained by collection component 102 is associated with temporal information 110, which includes the particular day (e.g., the day of the week) and hour of the day. For example, the amount of distance that can be traveled during rush hour (e.g., 7:30 a.m.) might be shorter (and the speed slower) than the distance that can be traveled at night (e.g., 8:00 p.m.), which can be traveled at a higher rate of speed. In some aspects, the temporal information 110 is obtained from the mobile device 104. However, in various aspects, the temporal information 110 is obtained based on system time, as illustrated.

In accordance with some aspects, the collection component 102 can obtain environment data 112, which can include data related to various events or situations (e.g., planned events, weather data, emergency situations, holidays, and so forth). For example, the speed information 108 gathered from the one or more mobile devices 104 might be different during a holiday (e.g., Fourth of July or Christmas season) than during a non-holiday event. For example, if the data is collected when the device is near a shopping mall, the speed (and travel time) might be different during the Christmas shopping season than during May. In another example, if there is an emergency (e.g., traffic accident) or heavy rain, the speed at which the device moves might be slower than during a non-emergency or during a dry spell.

The environment data 112 can be received directly from the mobile devices 104 (e.g., from user input, based on one or more sensors associated with mobile device 104, and so forth). In some aspects, the environment data 112 is inferred from various collection devices in the vicinity of the mobile devices 104 (e.g., weather reporting stations, emergency response notifications, and so forth) or based on sensors located within or near the respective mobile device 104 or road segments. In some aspects, the environment data 112 is collected from one or more mobile devices and/or one or more sensors.

An aggregation component 114 can be configured to combine each set of location information 106 and speed information 108 as a vector and retain the vector(s) in a retrievable format. Each mobile device can transmit multiple sets of location information 106 and speed information 108. For example, a mobile device can transmit is respective information periodically, randomly, or based on other criteria (e.g., a change in circumstances, upon request, and so forth).

In an example, the aggregation component 114 can be configured to create one or more vectors based on a combination of the location information and the speed information. In accordance with some aspects, the vectors are retained by a separate storage media 116, wherein the aggregation component 114 creates the vector and conveys the vector (and associated information) to the storage media 116. The vectors can be retained by the storage media 116 (or the aggregation component 114) as historical data.

Also included in system 100 is a mapping component 118 can be configured to provide access to a mapping application 120 that includes information related to side streets, state routes, highways, as well as private roadways. Further, the mapping application 120 can include various other information related to places within the map. Such information can include street addresses, locations of items (e.g., houses, buildings, parks, rivers, and so forth).

The mapping component 118 can be configured to plan one or more routes 122 as a function of the historical information (e.g., vectors) and/or other data received (e.g., temporal information, environment data, and so forth). For example, based on information received (e.g., a start location and/or an end location), mapping component 118 can determine a shortest route between the two locations. In accordance with some aspects, the mapping component 118 divides each route into smaller pieces or sections, referred to as route segments 124. For example, each of the planned one or more routes can include multiple route segments 124.

Each route segment should have a minimum distance defined between two geographic markers. For example, the route segments can be identified as existing between traffic lights, highway exits, or other known location markers. If the route segment is smaller than a minimum distance, the route segment can be combined with a second, contiguous route segment. The combination of two or more route segments can provide accuracy related to prediction of travel time, travel speed, as well as other parameters (e.g., road congestion, road work, planned events, and so forth). It should be noted that the various route segments do not need to have the same length. For example, a first route segment might be one-quarter mile long and a second route segment might be three-eighths mile long.

Speed estimates for each route segment can be based on average speed, collected from a multitude of mobile devices and/or sensors over a period of time (e.g., minutes, hours, days, weeks, and so forth). In some aspects, if there is a spike in speed (e.g., current traffic) or if traffic is slow or if traffic has changed over time (based on a combination of real-time and historical data), it can indicate that something in the segment has changed or is changing. By continuing to monitor and update the information received (including statistical information), the mapping component 118 can automatically update a predicted travel time and/or change routes (or a portion of a route) to provide the user with the best information so that the shortest route is taken, even in view of the dynamic nature of changing road conditions.

In an implementation, the collection component 102 can receive a request for potential starting locations in order to arrive at an end location at a specified time. The mapping component 118 can be configured to obtain alternative route information (e.g., routes 122) based on historical information associated with each alternative route, or historical information associated with route segments included in each alternative route. Based, in part, on the route or route segments, the mapping component 118 can be configured to determine various start locations. The various start locations can be output to the user in a number of formats. For example, the various start locations can be identified by street address, geographic coordinates, or another manner of identifying the location. In some aspects, the various start locations are displayed as bins on the map and the user can visualize the start locations based on color coding. For example, if the total desired travel time is 35 minutes, red bins can be utilized to symbolize start locations that require a travel time of 30 to 35 minutes, blue can be utilized to symbolize start locations that require a travel time of 20 to 30 minutes, green can be utilized to symbolize start locations that require a travel time of 10 to 20 minutes, and so forth. In some aspects, another indicator is utilized to provide the visualization and color-coding is utilized herein merely to describe one implementation. For example, words or numbers can be utilized in conjunction with the bins to indicate the total travel time. The travel time is independent of the distance required to be traveled. For example, it might take 20 minutes to travel 15 miles if there are no highways but, in an area where a highway is readily available, it might take 21 minutes to travel 27 miles, wherein both start locations are similarity identified (e.g., blue color coding based on the above example).

In some implementations, the collection component 102 can receive start location information and destination information, as well as a trip start time. The mapping component 118 can plan one or more routes, defined as a plurality of route segments 124, and can make a determination of the predicted time that will be spent traversing each segment of the route. The route segments 124 for the route (or each route in a set of alternative routes) can be divided into a first set and a second set. For example, the first set can include route segments that will take less than a threshold amount of time to traverse (e.g., 40 minutes) and the second set can include route segments that will take longer than the threshold amount of time to traverse. Real-time information is associated with the first set and historical information is applied to the second set in order to derive an anticipated travel time and to determine the route, or changes to a current route, that would result in the shortest travel time. Thus, the disclosed aspects can be configured to constantly revise a route, or change a route, as the user moves along the route.

The route and anticipated travel time can be presented to the user in any perceivable format. In an example, a map that includes the route and the anticipated travel time for the entire route, a subset of route segments, or for each route segment can be displayed on a graphical user interface of the mobile device.

Figure 2:
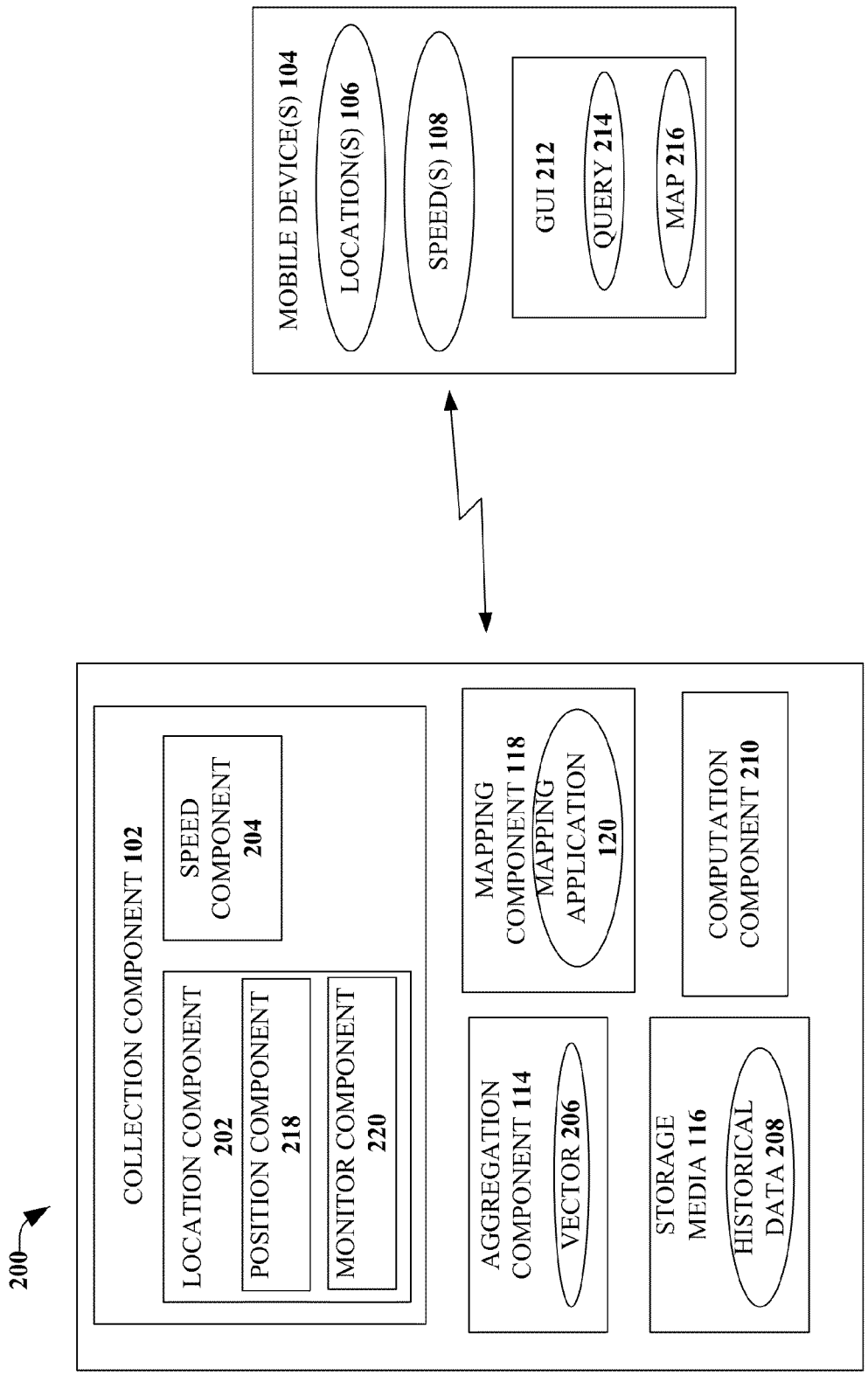
FIG. 2 illustrates an example, non-limiting system for collecting real-time information for automatic travel time and routing determinations in a wireless network, according to an aspect.

FIG. 2 illustrates an example, non-limiting system 200 for collecting real-time information for automatic travel time and routing determinations in a wireless network, according to an aspect. In an aspect, system 200 can be a part of a mobile network, and can reside at least in part within at least one of a network management component (e.g., radio network controller, core network, or network gateway) or a base station or access point.

System 200 includes a collection component 102 that can be configured to receive information related to one or more mobile devices 104. For example, included in collection component 102 is a location component 202 that can be configured to collect location information 106 of one or more mobile devices 104. Also included in collection component 102 is a speed component 204 that can be configured to collect speed information 108 of the one or more mobile devices 104. The location information 106 and/or the speed information 108 can be provided respectively to the location component 202 and the speed component 204 continuously, periodically, randomly, upon request, or based on some other criteria (e.g., a speed change of 5 miles per hour, change in direction of travel, and so forth). Further, the collection component 102 can gather temporal information and/or environment information, which can be mapped to the location information 106, the speed information 108, or combinations thereof.

An aggregation component 114 can be configured to create a vector 206 based on a combination of the location information 106 and the speed information 108. The vector 206 can be retained in a storage media 116 as historical data 208. The historical data 208 can be accessed by other systems and/or mobile devices in order to provide services related to automatic travel time and routing determinations in a wireless network. In some aspects, the historical data 208 is obtained by systems and/or mobile devices in remote locations. For example, a user in New Mexico might want to travel to Missouri. Therefore, historical data related to route segments located in New Mexico, Texas, Oklahoma, Kansas, and Missouri can be accessed in order to provide routing information and an estimated travel time.

System 200 also includes a mapping component 118 that can be configured to provide access to a mapping application 120. A computation component 210 can be configured to utilize the vector 206 (and/or historical data 208) and the mapping application 120 to determine an estimated travel time with respect to a defined location (e.g., a start location, a destination location, and so on).

For example, each of the one or more mobile devices 104 can include respective graphical user interfaces (GUI) 212. A user can interact with the GUI 212 to input a query 214 related to a determination of a travel time for streets located in the mapping application 120 (or located in more than one mapping application, depending on the size of the map). A map 216 can be rendered to the user through the GUI 212, where the map 216 includes information related to a route and/or travel times for the route or one or more subsets of the route (e.g., route segments).

According to some aspects, alternative routes and/or alternative start locations can be presented to the user through the GUI 212. The user can interact with system 200 to select one of the routes and/or one of the alternative start locations. In some aspects, the user can interact with the system 200 in order to modify the query 214, change one or more parameter, enter personal information, or perform other forms of interaction with the system 200 (e.g., answer questions posed by system 200, request a change to one or more route segments, and so forth).

In accordance with some aspects, location component 202 includes a position component 218 that can be configured to provide an indication of a current location of a mobile device. For example, the position component 218 can be located, at least in part, in a mobile device. Information related to the current location can provide real-time information, which can be retained as historical data for later use. In some aspects, the real-time information can be utilized to modify the predicted travel time and/or to modify a recommended route for the mobile device from which the information was received or for a different mobile device.

Also included in location component 202 is a monitor component 220 that can be configured to determine if a mobile device (to which a particular estimated travel time and/or recommend route pertains) has traversed at least one route segment of the plurality of route segments. For example, the route can be divided into a multitude of route segments and each of the multitude of route segments can be placed into a first set and a second set. For example, the first set can include route segments that will take less than a threshold amount of time to traverse (e.g., 55 minutes) and the second set can include route segments that will take longer than the threshold amount of time to traverse. As the mobile device moves through the route, an adjustment might need to be made to the remaining estimated travel time. For example, the speed at which the mobile device is moving might be faster (or slower) than predicted. Thus, as the mobile device has traversed a route segment (or seems to be retained for a long time in a route segment), the monitor component 220 can modify the route segments that are in the first set and/or the second set. For example, as the mobile device is moving, it might be estimated that one or more route segments in the second set are now within the threshold amount of time. Thus, those route segments are placed within the first set and the route segments already traveled through are discarded (e.g., removed from the first set).

In an example, I am in Atlanta and want to create a route to Dallas and want to travel the fastest route. The current travel conditions are adequate for where I am now (near term). If I have to drive through Birmingham, I might not be there for 3 hours, therefore, current traffic conditions are immaterial for that location. Therefore, system 200 can apply predicated information related to what the conditions might be like in Birmingham three hours from now. Thus, a piece wise estimation—starting at a current location and based on current traffic conditions (e.g., one hour from where I am) can be utilized to obtain the best predictions of travel time and/or recommended route. Once outside that half hour to one hour timeline, system 200 can build the routing based on information related to the same day of the week, same hour of the day type of information based on historic measurements. For example, if it is 5 p.m. and traffic is backed up in Atlanta and it is predicted that it will take three and a half hours to arrive in Birmingham, it might be useful to know how long it will take to travel through Birmingham. In some cases, it might be better to take a different route (e.g., bypass Birmingham). Since it is over three hours away, historical data (same day of week/same time of day) can be applied.

The computation component 210 can be configured to calculate a time remaining to reach the defined location if at least one route segment has been traveled, or if there is a change to the estimated travel time based on the segment not being travelled (e.g., traffic jam). Continuing the above example, two route segments have been traveled and are discarded from the first set and three route segments from the second set are added to the first set (and removed from the second set). Computation component 210 applies real-time information to the three route segments and re-computes the time remaining. In some aspects, the time remaining will change especially in the case where the real-time information is different from the historical information (e.g., there has been an emergency situation and traffic is slower, and so forth). The modifications by monitor component 220 and computation component 210 are on-going (e.g., continuous or nearly continuous) such that at about the same time as a modification is needed, the modification can be applied and updates can be automatically presented to the user. Such dynamic updates and output of information can allow the user to have the most up-to-date information and more informed decisions can be made (e.g., would it be better to stop for dinner now to avoid sitting in traffic, would it be better to travel a little longer before stopping for the night, and so forth).

Figure 3:
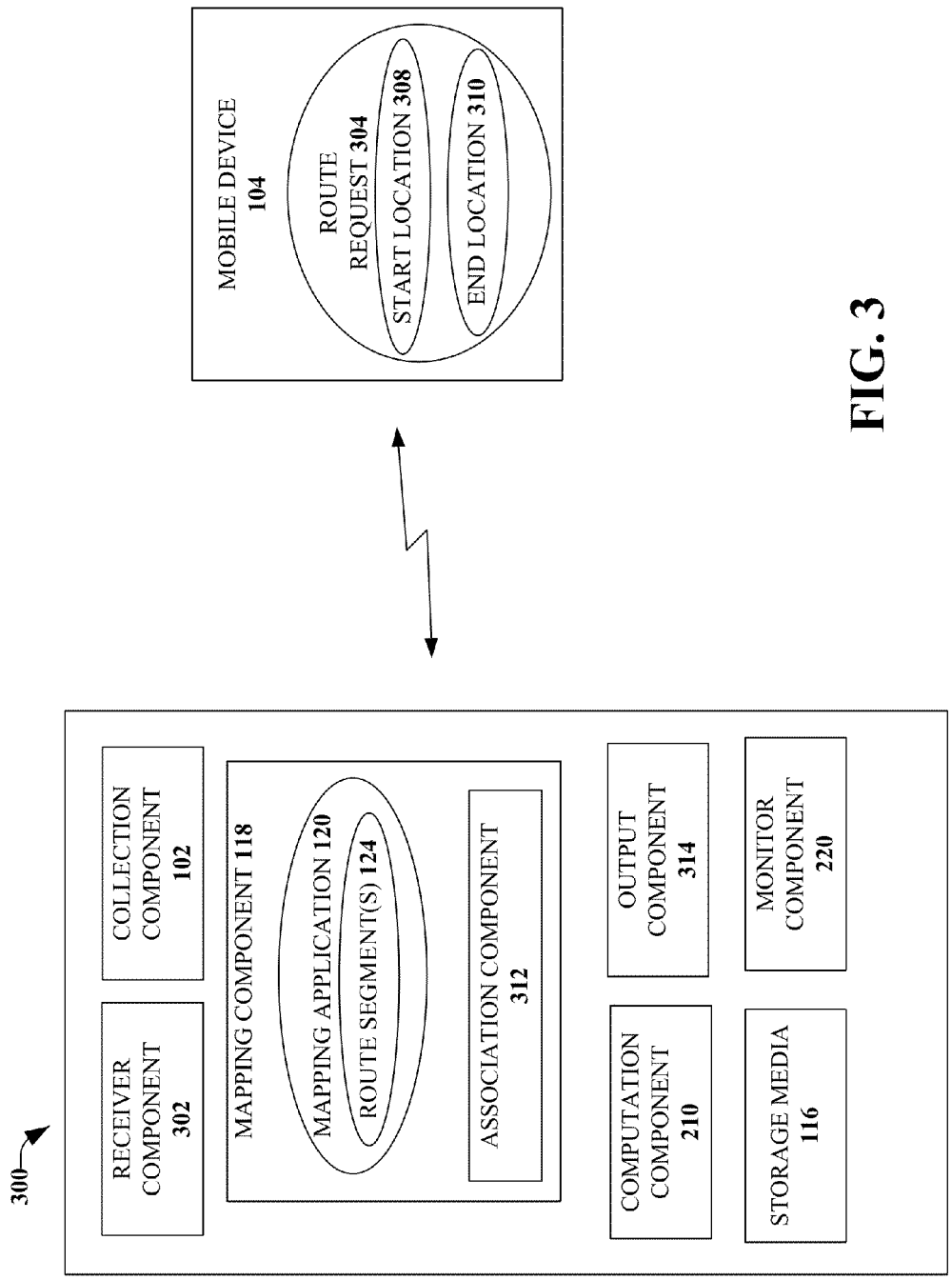
FIG. 3 illustrates an example, non-limiting system for routing traffic, according to an aspect.

FIG. 3 illustrates an example, non-limiting system 300 for routing traffic, according to an aspect. In an aspect, system 300 can be a part of a mobile network, and can reside at least in part within at least one of a network management component (e.g., radio network controller, core network, or network gateway) or a base station or access point. System 300 can be configured to collect mobile subscriber traffic speed per route segment and establish historical trends that can be used for traffic routing. For example, if a user requests routing during the night when traffic along most of the route is low density and high speed, system 300 would not assume the persistence of those traffic conditions at the time the user might be traveling along the route. Instead, system 300 would anticipate when the user would be on each segment and use historical information to predict the conditions at that time. Such historical trending can take into account not only the time of day, but day of week, holidays, known events such as sporting events, planned road closures, planned road work, and so forth. In some aspects, system 300 can utilize both real-time and historical information to predict the traffic conditions. For example, if the user plans to leave on the trip in 30 minutes, real-time information might be used for the first ten minutes of the trip and historical information applied to the remainder of the trip.

System 300 can be configured to utilize both real-time and historical location information to determine and predict traffic metrics on various road segments. Based on the determined and predicted traffic metrics, system 300 can route traffic to provide a shortest time from a first location (e.g., a start location) to a second location (e.g., destination location). In accordance with some embodiments, the aspects disclosed herein can be utilized for government emergencies, police vehicle routing, emergency vehicle routing, freight truck routing, mobile subscriber (e.g., user) routing, and so forth. Further, the disclosed aspects can provide more accurate travel calculations, law enforcement assistance to regulate traffic, to synchronize traffic lights, to establish speed traps, and for other purposes.

System 300 includes a receiver component 302 that can configured to obtain a route request 304. To receive the route request 304 (as well as other information), the receiver component 302 can include one or more antennas configured to receive a signal (e.g., wirelessly or over the air). In another example, the receiver component 302 can be operatively coupled directly to one or more other components of system 300 and can be configured to directly receive the route request 304 (or other information). For example, a user can enter the route request on a graphical user interface (GUI) associated with a user device, illustrated as a mobile device 104.

The route request 304 can include a request for directions, or a best route, from a start location 308 to a destination or end location 310. The start location 308 and/or end location 310 (e.g., location information) can be provided (e.g., received from the user) in various formats. For example, the location information can be provided in the form of street addresses (and associated city, state, and/or zip code information), as geographic coordinates, as a place name (e.g., Acme Hotel in Phoenix, Ariz. or Acme Manufacturing Brothers in Canton, Ohio), as road intersections (e.g., corner of Painter Road and Pond Drive), as well as other forms of entering location information.

In accordance with some aspects, the route request 304 includes more than one start location 308 and/or more than one end location 310. For example, if an extended trip is being planned (e.g., over a period of days), the extended trip might include stops at various locations. In a family vacation example, the various locations can include a restaurant, a friend's house, a motel, a gas station, a tourist attraction, and so forth. In the case of a truck driver, for example, the various locations can include a rest area on a highway, a restaurant, a weigh station, a diesel fueling station, a warehouse where items might be picked up or dropped off, and so forth.

System 300 also include a collection component 102 that can be configured to obtain current location information and speed information for the mobile device 104. The location information and speed information can be combined with temporal information and/or environment information in order for system 300 to more accurately predict travel time as well as recommending a travel route.

Also included in system 300 is a mapping component 118 that can be configured to plan a route from the start location 308 to the end location 310. In accordance with some aspects, to plan the route (or in some cases more than one route or alternative routes), the mapping component 118 can be configured to utilize a plurality of route segments 124, located between the start location and the destination location. For example, mapping component 118 can be configured to obtain information related to multiple route segments 124 that are to be traversed when traveling from the start location 308 to the end location 310. For example, mapping component 118 can include a mapping application 120 (or can be configured to access a mapping application) that can include the route segments 124 and information associated with the route segments 124. Such information can include speed information (e.g., average speed, maximum speed, minimum speed, posted speed, speed for individual vehicles, and so forth). Other information can include planned events (e.g., parades, school-zones, sporting events, road construction, and so on) associated with one or more route segments 124. According to some aspects, the information includes real-time information (e.g., a traffic accident, an obstruction in the road such as a tree downed during a storm, heavy snowfall, emergency equipment on location, and so forth). One or more types of information related to each route segment can include a temporal aspect (e.g., time of day, day of week, and so on). For example, the average speed traveled by vehicles on a particular route segment (which can be higher than the posted speed) might be faster at 5:30 a.m. than at 2:00 p.m. In another example, one or more route segments might experience "rush hour" traffic where the speed is dramatically slower on weekdays than on weekends or at a different time of the day. According to another example, one or more road segments (e.g., near a high school or college) might have slower and heavier traffic on Friday nights due to a sporting event (e.g., football game).

In the case where there are multiple start locations and/or destination locations, such as routes that are expected to encompass many hours or more than one day, routes between each pair of start location and destination location can be planned by mapping component 118. For example, a first (start) location can be from a work location or from where a vehicle is to be picked up, a first (destination) location can be at a warehouse where widgets will be loaded into the vehicle, and a second (start) location is from the warehouse to a second (destination) location, such as a factory or store.

In accordance with some aspects, the receiver component 302 can be configured to receive an expected start time and day for the route. For example, in the case of an over-the-road truck driver, an expected start time might be 7 a.m. on Monday. In some aspects, the start of the trip might be immediately, such as would be the case in an emergency situation. Thus, system 300 can be configured to automatically perform the route planning based on the time that the request is received or based on a time in the future (e.g., in three hours, next Wednesday, and so forth). For example, if a threshold value is 45 minutes, route segments that are expected to be traversed within the first 45 minutes (if the trip is to start immediately) are associated with the first set and the route segments that are expected to take longer than 45 minutes to traverse are placed in the second set.

The mapping component 118 can include an association component 312 that can be configured to divide the route segments 124 into at least two sets: a first set of route segments and a second set of route segments. For example, a threshold distance or a threshold time can be utilized by association component 312 to determine the route segments that are to be applied to the first set and the route segments that are to be applied to the second set. In an aspect, the association component 312 can be configured to determine the first set is less than or equal to a threshold value and the second set is greater than the threshold value. In some implementations, a temporal amount is assigned as the threshold value (e.g., 35 minutes, 1 hour and 5 minutes, and so forth). In other implementations, a distance traversed is assigned as the threshold value (e.g., 5 miles, 23 miles, and so on).

Route segments in each of the different sets are contiguous such that a first route segment is to be traversed before a second route segment. Further, the route segments in the first set are contiguous with the route segments in the second set, such that the route segments in the first set are traversed before the route segments in the second set are traversed. For example, if the entire route is predicted to take three days, the route segments estimated to be within the first 45 minutes of the trip are associated with the first set and the route segments for the remaining hours and days are associated with the second set.

A computation component 210 can be configured to calculate a travel time for the route(s) as a function of the association performed by the association component 312. For example, computation component 210 can be configured to apply real-time information to the route segments in the first set and historical information to the route segments in the second set. The real-time information can include information relating to what is actually occurring at a present time (e.g., at this moment in time). The historical information can be retained by a storage media 116 (or another component). In some aspects, the gathered real-time information is saved as historical information.

An output component 314 can be configured to push the route and the calculated travel time to the mobile device 104. In an example, the route and the calculated travel time can be rendered on a graphical user interface of the user device. In other aspects, the route and calculated travel time is output in other formats, including visual and audio formats.

The system 300 also includes a monitor component 220 that can be configured to monitor a device location as the mobile device moves within the first set of the plurality of route segments. For example, the first set might include ten distinct route segments. The monitor component 220 is able to determine when the user device is moved through the first segment and into the second segment, for example. As the route segments are traversed, one or more of the route segments might now be within the threshold value, which can be a moving value with respect to a current time. For example, if the threshold value is 45 minutes, after five minutes (or another amount of time), at least one route segment from the second set might be able to be traversed in under 45 minutes. Thus, that route segment is now associated with the first set and the association component 312 updates that route segment with real-time information, instead of the historical information. The output component 314 can be configured to send the real-time information for the route segment that is now located within the first set to the user device for presentation to the user.

In accordance with some aspects, computation component 210 can be configured to automatically determine a remaining travel time as a result of elapsed time or distance traveled. The updated or recalculated remaining time can be conveyed to the user device by output component 314. In some implementations, the computation component 210 augments the route and the calculated travel time with the real-time information for the updated first set of the plurality of route segments. The augmented route and calculated travel time is sent to the user device by the output component 314.

In accordance with some aspects, the receiver component 302 obtains information related to planned stops during the route. The planned stops can be entered at about the same time as the route request is entered or at a different time (e.g., while the route is being traversed, while planning the trip, and so forth). For example, the planned stops can include dinner breaks, rest stops, as well as other planned stops. The temporal information for the planned stops is added to the travel time by computation component 210. The duration of the planned stops can be input by the user or inferred by other information (e.g., an average time for the stop based on historical data, reported information, user preferences, and so forth). For example, the reported information can include information reported by a restaurant, which can be current wait times. The user preferences can include the duration of time that the user has historically spent at the same or a similar stop, and so forth.

In some implementations, computation component 210 can be configured to determine a day and a time of the day that each segment of the second set will be traversed. Based on the determination, an amount of time needed to travel through each segment is predicted based on the historical information associated with each route segment.

In some aspects, planning the route includes applying user preferences. For example, a user preference might be to eat lunch at 2:00 p.m. and might also include the types of restaurants that the user historically visits. The mapping component 118 can dynamically locate the preferred type of restaurant, if available, around the preferred lunch time. If there are two or more restaurants that share similar criteria along the route at around the same time (e.g., 1:30 p.m. and 2:30 p.m.), the user can be presented with the alternatives. Based on the decision of the user, updates to the remaining time and/or the planned route can be automatically applied.

Figure 4:
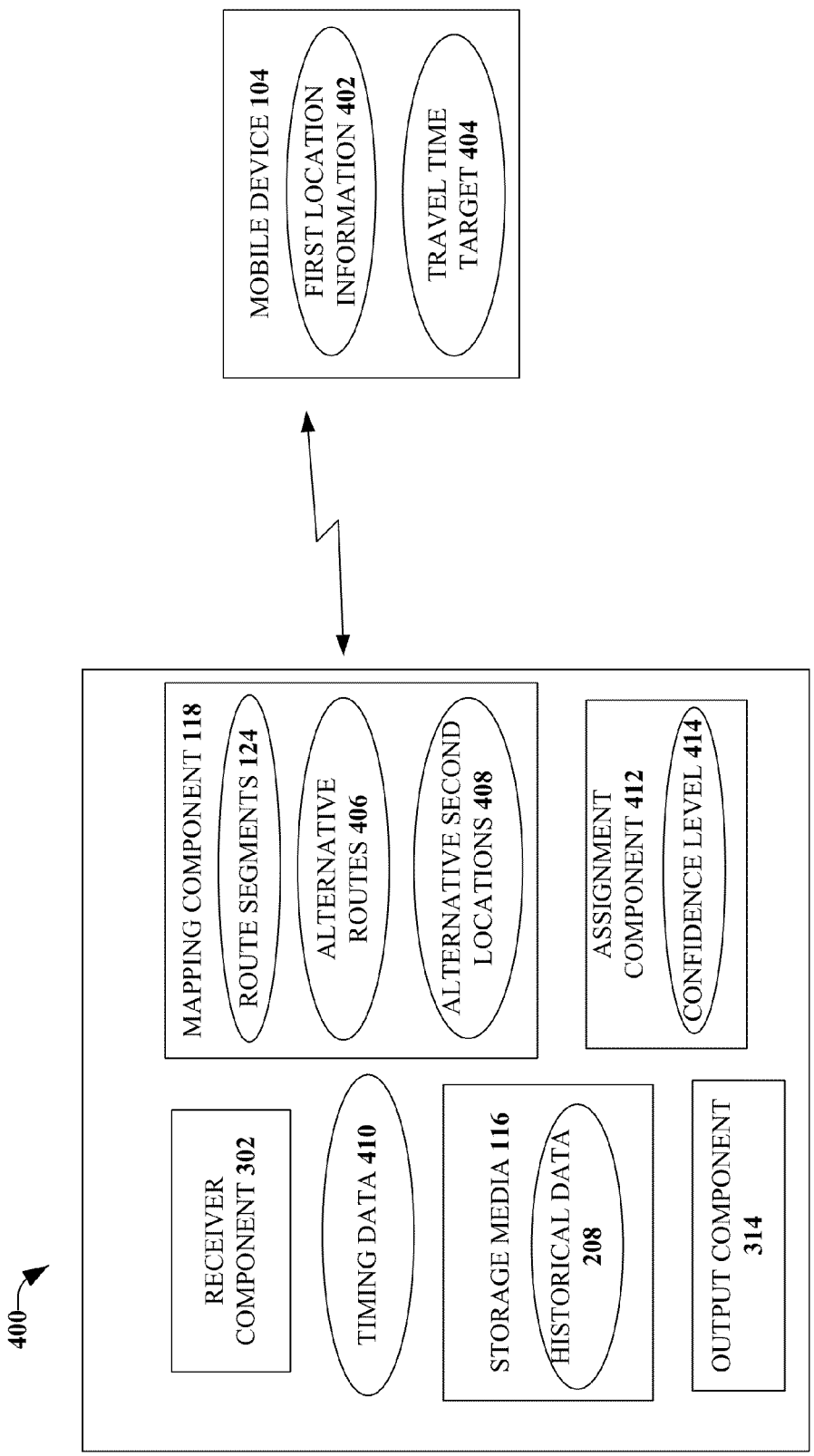
FIG. 4 illustrates a non-limiting example system for mapping travel time to a destination, according to an aspect.

With reference now to FIG. 4, illustrated is a non-limiting example system 400 for mapping travel time to a destination, according to an aspect. In an aspect, system 400 can be a part of a mobile network, and can reside at least in part within at least one of a network management component (e.g., radio network controller, core network, or network gateway) or a base station or access point. Typically, a person has to make very rough estimates of what traffic speed might look like (e.g., on major highways, in a city, and so on) at various times of day. The result tends to be the user trying to find a starting location within a given distance from the destination, which then typically manifests in the establishment of concentric rings around the destination with varying radii. Some adjustments might be made if one knows that particular routes have higher or lower typical speeds. However, the user will not have detailed information for most streets, will not have well refined information as a function of time, and will not have statistical information for any portion of the route. Consequently, the user is unable to find the set of starting points meeting the input criteria of destination point, arrival time, and confidence.

System 400 can be utilized to provide an estimate of the length of time it is likely to take to travel to a specific destination from many different starting locations in order to arrive at the destination at a specific time. For example, a person might be relocating to a new city and knows their specific work address and that the start time will be 8:00 a.m. In order to find a place to live in the new city, the person might want to know, for many potential starting locations (and potential places to live), how long it would take to arrive at work each day. System 400 can be configured to calculate, as a function of historical information, the travel time. In accordance with some aspects, system 400 can be configured to determine the potential starting locations based on a maximum amount of travel time. Further, system 400 can be configured to render a map to the user that provides the requested information.

Included in system 400 is a receiver component 302 that can be configured to obtain a first location information 402. For example, the first location information 402 can be received from a user device, illustrated as a mobile device 104. The first location information 402 can be a current location of the mobile device 104. However, according to some aspects, the first location information is a location that is input by the user of the mobile device and is not the current location of the mobile device. For example, the first location information can be related to a start location or a destination location.

Receiver component 302 can also be configured to receive a travel time target 404, which can be input by the user. The travel time target 404 represents an amount of time that is to be traveled in relation to the first location information 402. For example, the travel time target 404 might be "no more than 40 minutes".

Also included in system 400 is a mapping component 118 that can be configured to calculate alternative routes 406 as a function of the first location information 402 and the travel time target 404. For example, the mapping component 118 can include information related to route segments 124. The mapping component 118 can also be configured to derive alternative second locations 408 based on the alternative routes 406.

An output component 314 can be configured to send the alternative routes 406 and alternative second locations 408 to the mobile device 104. The alternative routes 406 and alternative second locations 408 can be rendered on the user device in any perceivable format. For example, the alternative second locations 408 can be output in a map format.

In accordance with some aspects, the receiver component 302 can be configured to receive a start location and the mapping component 118 can be configured to determine alternative destination locations. The alternative destination locations can be displayed on the user device. Alternatively, the receiver component 302 can be configured to receive a destination location and the mapping component 118 can be configured to determine alternative start locations. The alternative start locations can be displayed on the user device.

In some aspects, timing data 410 can be associated with the travel time target 404. For example, the timing data 410 can include a day of a week and a time of day. The mapping component 118 can utilize the timing data 410 in conjunction with historical data 208, which can be retained by a storage media 116 or another component, to derive the alternative second locations 408.

In some implementations, system 400 also includes an assignment component 412 that can be configured to associate a confidence level 414 with each of the alternative second locations 408. The confidence level 414 can be transmitted to the user device 106 by output component 314. In accordance with some aspects, assignment component 412 can be configured to assign different confidence levels to each of the route segments.

For example, the user can be presented with a route that has an expected travel time with a confidence level (e.g., 75% confidence). Arriving at a destination at a certain time on average may be less important than having a high confidence level (e.g., 90% confidence) of arriving at the destination on time. Therefore, the graphical user interface (or other means for interfacing with a user) allows the user to enter the required destination, arrive time, required confidence, and geographic search area for which results are returned, as disclosed herein.

In an example, system 400 can be utilized to search for a used car (or another item). The user can enter the search criteria (e.g., make, model, year, and so forth) as well as a total travel time (e.g., 45 minutes). System 400 can be configured to locate the car, based on the search criteria provided, and output the information to the user. Thus, instead of inputting to find a car within 50 miles, for example, the user can specify the amount of travel time. If the radius of the search were input in the form of mileage, it might produce a travel time that is longer than desired (e.g., it might take 2 hours to travel the 50 miles). Further, it might be a shorter distance to some places than to other places. For example, a car dealership might be right off the highway and, based on the average speed on the highway, it will take 45 minutes to travel 60 miles (which would have been out of the criteria were mileage entered and used as the travel criteria). If, on the other hand, 50 miles were entered, the search might find a private owner selling a car that is within 50 miles, but requires back roads to be traveled, which makes the duration of the route an hour and twenty minutes, which is too long for the user. Thus, better search results can be presented with the disclosed aspects.

Figure 5:
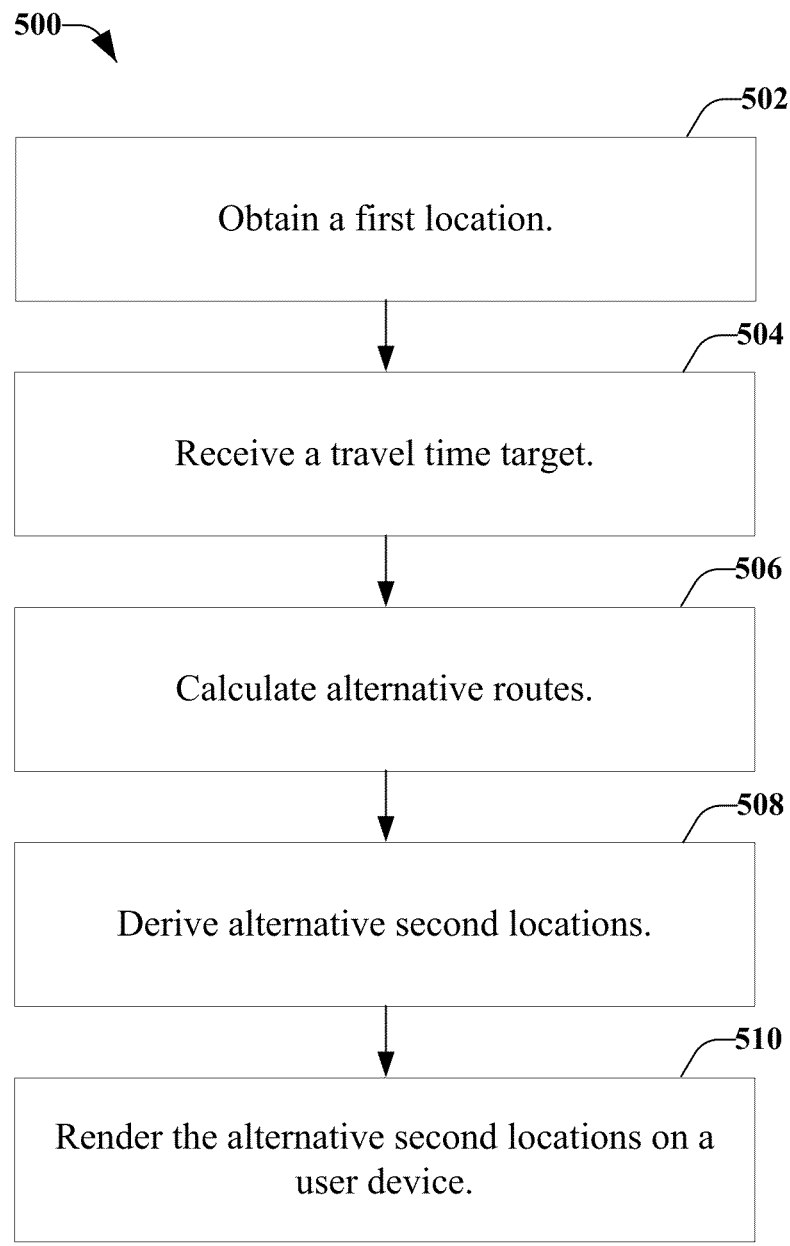
FIG. 5 illustrates a method for mapping travel time from a set of origins to a destination using historical location data, according to an aspect.

FIG. 5 illustrates a method 500 for mapping travel time from a set of origins to a destination using historical location data, according to an aspect. Method 500 starts, at 502, when a first location is obtained. A travel time target is received, at 504. The travel time target represents an amount of time to be traveled in relation to the first location (e.g., "I only want to travel 40 minutes to find a car").

Based on the first location and the travel target time, alternative routes are calculated, at 506. The alternative routes can be calculated as a function of the first location and the travel target time. In accordance with some aspects, the alternative routes are each divided into route segments and the calculating, at 506, is based on the route segments and historical information associated with each of the route segments.

At 508, alternative second locations are derived based on the alternative routes. For example, each of the alternative second locations can be different distances away from the first location, but might be within a threshold travel time. The alternative second locations are rendered on a user device, at 510. In an aspect, the alternative second locations are rendered as a map.

In accordance with some aspects, obtaining the first location includes receiving a start location and deriving the alternative second locations comprises determining alternative destination locations. Further to this aspect, rendering the alternative second locations includes displaying the alternative destination locations on the user device.

In another aspect, obtaining the first location includes receiving a destination location and deriving the alternative second locations comprises determining alternative start locations. Further to this aspect, rendering the alternative second locations includes displaying the alternative start locations on the user device.

In some aspects, the method includes collecting data associated with each of the route segments. The data can be collected as the mobile device is moved through the route. In some aspects, the data is collected from other devices or sensors that are in or near the route segments. The data is retained as historical information for later use in planning a route and/or predicting travel time.

Figure 6:
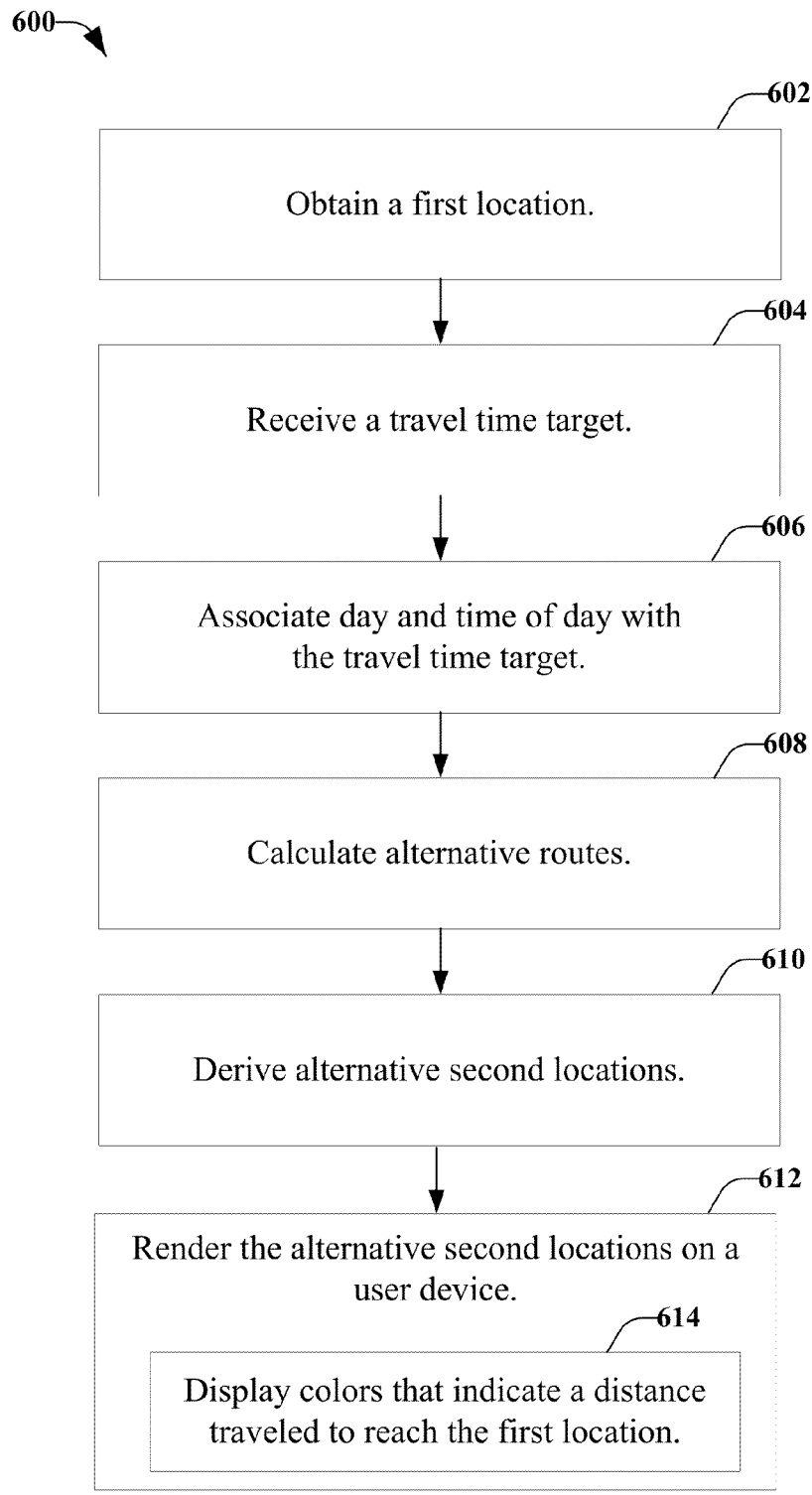
FIG. 6 illustrates another method for mapping travel time from a set of origins to a destination using historical location data, according to an aspect.

FIG. 6 illustrates another method 600 for mapping travel time from a set of origins to a destination using historical location data, according to an aspect. At 602, a first location is obtained and, at 604, a travel time target is received. A day of a week and a time of day are associated with the travel time target, at 606. Alternative routes to the destination are calculated as a function of the first location, the travel time, and based on using historical information related to the day and the time of day.

At 608, alternative second locations are derived and rendered on a user device, at 610. In accordance with some aspects, rendering the alternative second locations includes displaying, at 614, colors that indicate a distance traveled to reach the first location. In accordance with some aspects, the indication of a distance traveled is a function of an amount of time estimated to travel the distance.

Figure 7:
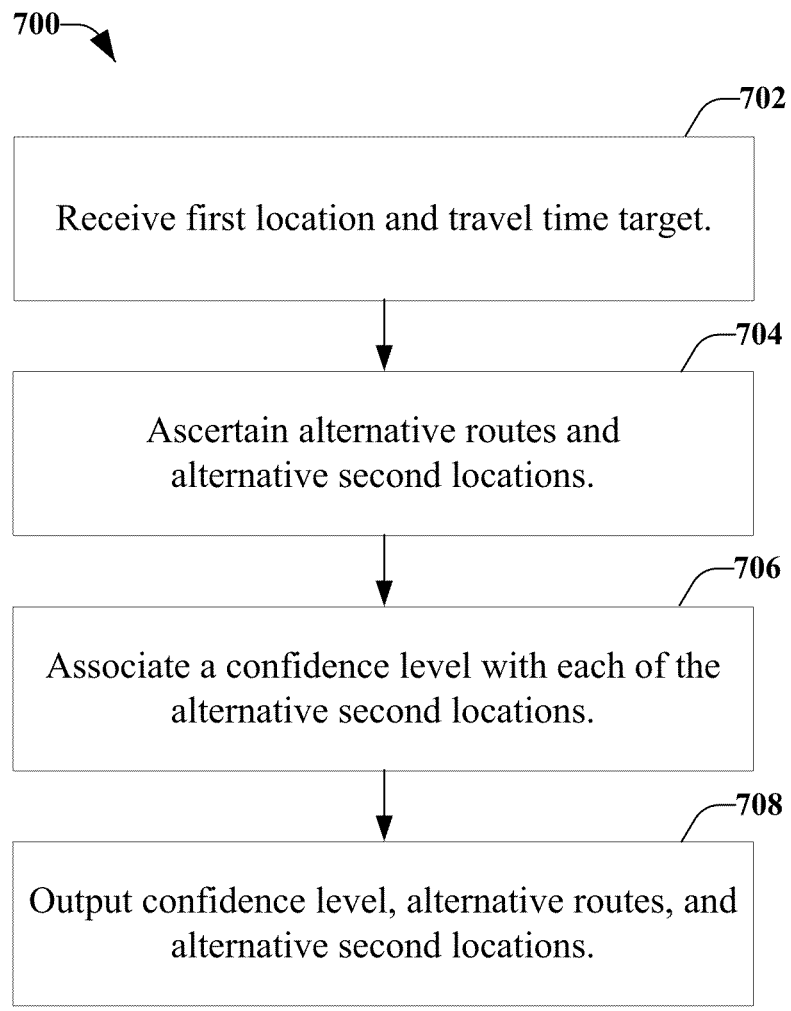
FIG. 7 illustrates a method for ascertaining potential start locations as a function of travel time to an end location using historical location data, according to an aspect.

FIG. 7 illustrates a method 700 for ascertaining potential start locations as a function of travel time to an end location using historical location data, according to an aspect. At 702, a first location and a travel time target are received. The travel time target represents the maximum amount of time that should be traveled from a second location in order to arrive at the first location at a specified time (e.g., 7:30 a.m., 3:15 p.m., 10:45 p.m., and so forth). At 704, alternative routes and associated alternative second locations are ascertained. For example, route segments from the first location are analyzed to determine historical travel time values associated with each route segment. If the total travel time for the route segment is less than the travel time target, a second route segment is analyzed, wherein the second route segment is contiguous to the first route segment. If the historical (predicted) travel time for both the first and the second route segments are less than the travel time target, a third route segment, contiguous to the second route segment, is analyzed. Similar analysis is performed for additional route segments until the total travel time of all route segments is equal to the target travel time. If the total travel time is more than the travel time target, the last route segment added can be subdivided (e.g., in half, in third, in quarters, and so forth) to bring the total travel time of all segments to equal to or less than the target travel time. In some aspects, the last route segment added is removed in order to bring the total travel time to less than or equal to the target travel time.

The alternative second locations can be represented anywhere along a single route (e.g., comprising a multitude of route segments) or different routes. For example, a first route might be 25 miles along and there might be three potential start locations. Each of these start locations can be ascertained based on historical data, mapping information, as well as other information. The historical data can be based on the amount of time needed to travel through a small town that is close to an exit. The mapping information can include the various exit and entrance ramps to a highway. The other information can include user preferences (e.g., the user does not want to live within five minutes of the highway, the user has specified at least one city where she will not live, and so forth).

At 706, a confidence level is associated with each of the alternative second locations. The confidence level can be represented as a percentage or based on another form of conveying the confidence level (e.g., color-coding, a number ranking, letter grades, and so forth). The confidence level, the alternative second locations, and the alternative routes are output, at 708.

Figure 8:
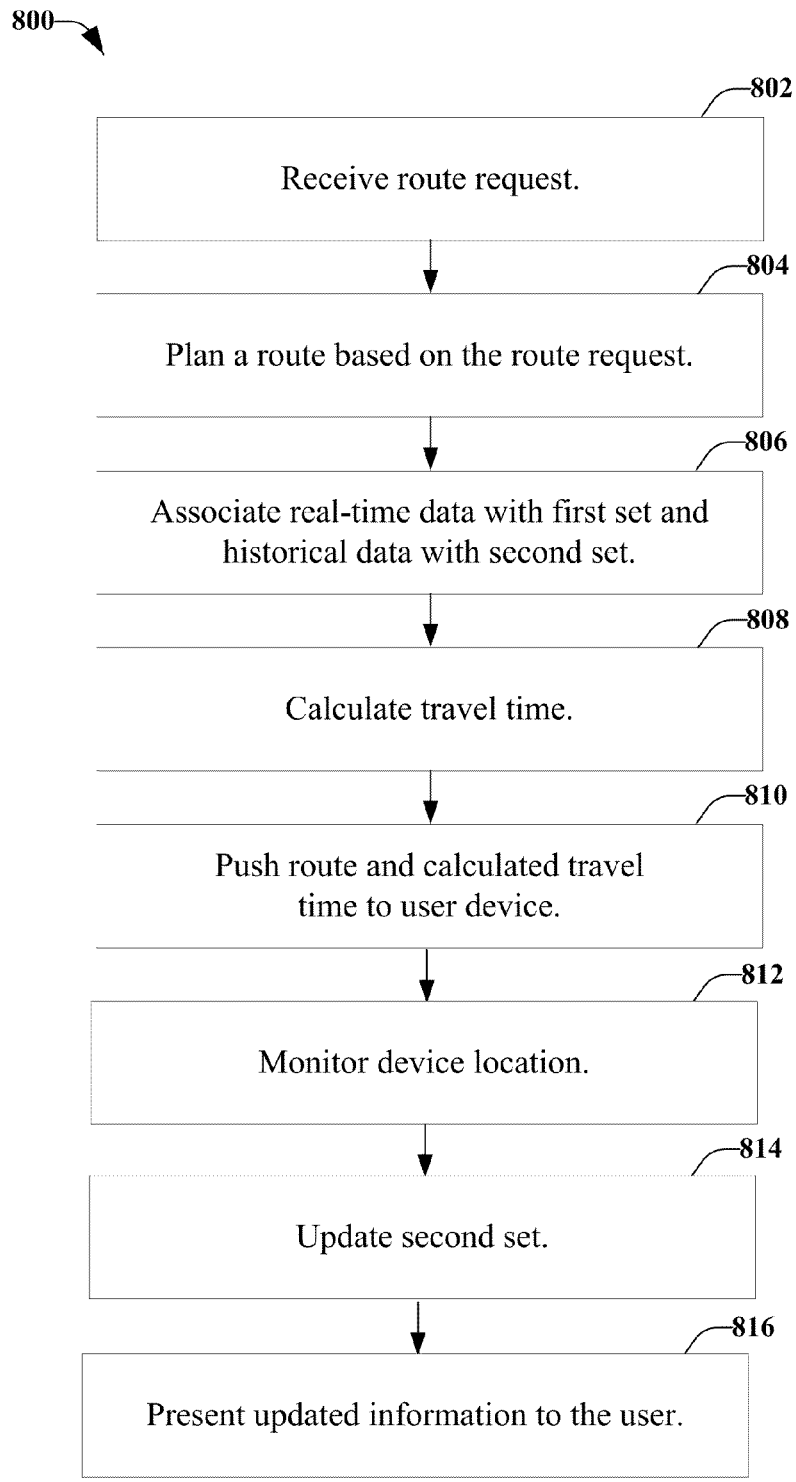
FIG. 8 illustrates a method for defining a shortest route between two points based on current and historical data, according to an aspect.

FIG. 8 illustrates a method 800 for defining a shortest route between two points based on current and historical data, according to an aspect. Method 800 starts, at 802, when a route request is received. The route request can include a start location and a destination location. At 804, a route is planned based on a plurality of route segments located between the start location and the destination location. The route can be planned as a function of a shortest travel time between the start location and the destination location.

At 806, real-time information is associated with a first set of the plurality of route segments and historical information is associated with a second set of the plurality of route segments. A travel time for the route is calculated, at 808, as a function of the real-time information and the historical information is selectively applied to the first set and the second set.

At 810, the route and the calculated travel time are pushed to a user device. The route and travel time can be output to the user on a display, such as in map format. In some aspects, the route and travel time is presented in other manners (e.g., audible means).

A device location is monitored, at 812. For example, the device can be moved through the first set of the plurality of route segments and, at 814, the second set is updated with real-time information. The real-time information for the second set is sent to the user device, at 816. For example, sending the real-time information can include augmenting the route and the calculated travel time with the real-time information for the second set. In accordance with some aspects, method 800 includes determining a remaining travel time as a result of the update and conveying the remaining travel time to the user device for presentation to the user.

Figure 9:
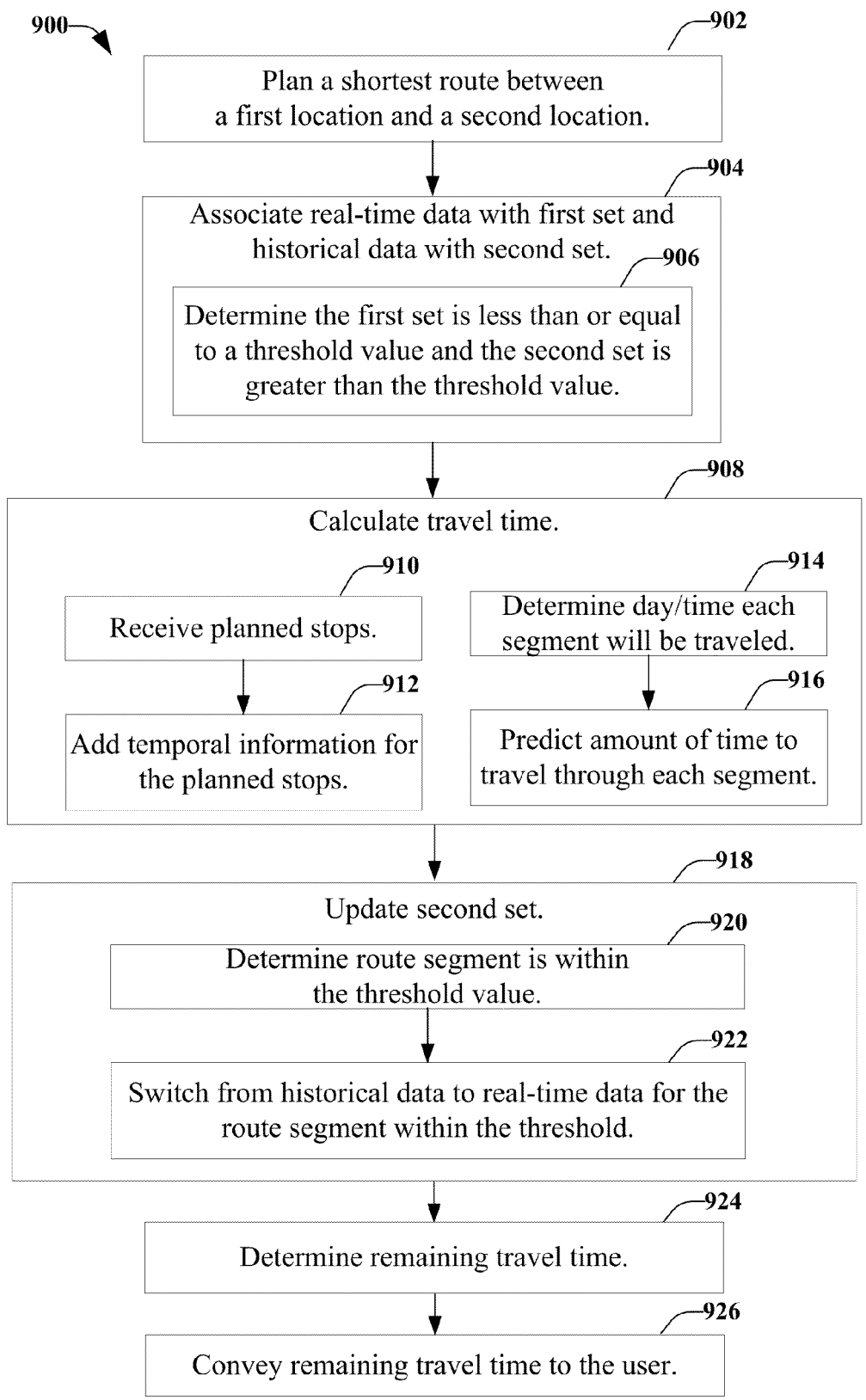
FIG. 9 illustrates a method for calculating a shortest route as a function of real-time information and historical information, according to an aspect.

FIG. 9 illustrates a method 900 for calculating a shortest route as a function of real-time information and historical information, according to an aspect. At 902, a shortest route is planned based on calculating travel times associated with route segments that can be traveled from a first location to a second location. The route segments can be divided into a first set and a second set. At 904, real-time information is associated with a first set and historical information is associated with the second set.

The association can include determining, at 906, the first set is less than or equal to a threshold value and the second set is greater than a threshold value. In an aspect, the threshold value can be a configurable or a predetermined amount of time (or temporal amount), after expiration of which real-time information is no longer applicable to predict future events. According to other aspects, a distance traveled is assigned as the threshold value.

At 908, a travel time is calculated for the route. The calculation can include receiving information related to planned stops during the route at 910, and adding temporal information for the planned stops to the travel time, at 912. According to some aspects, the calculation can include determining, at 914, a day and a time of the day that each segment of the second set will be traveled and predicting, at 916, an amount of time needed to travel through each segment based on the historical information associated with each segment. The calculated travel time can be presented to the user.

The second set is updated, at 918, based on movement of the device. For example, the device location can be monitored as the device is moved within the first set of route segments. According to some aspects, the updating includes determining, at 920, a route segment in the second set is within a threshold distance or a threshold time.

In accordance with some aspects, method 900 can include determining, at 922, a remaining travel time as a result of the updating. At 924, the remaining travel time is conveyed to the user through the device. The user has the option to change the route being traveled, incorporate one or more stops in the route, continue with the current route, and so forth.

Figure 10:
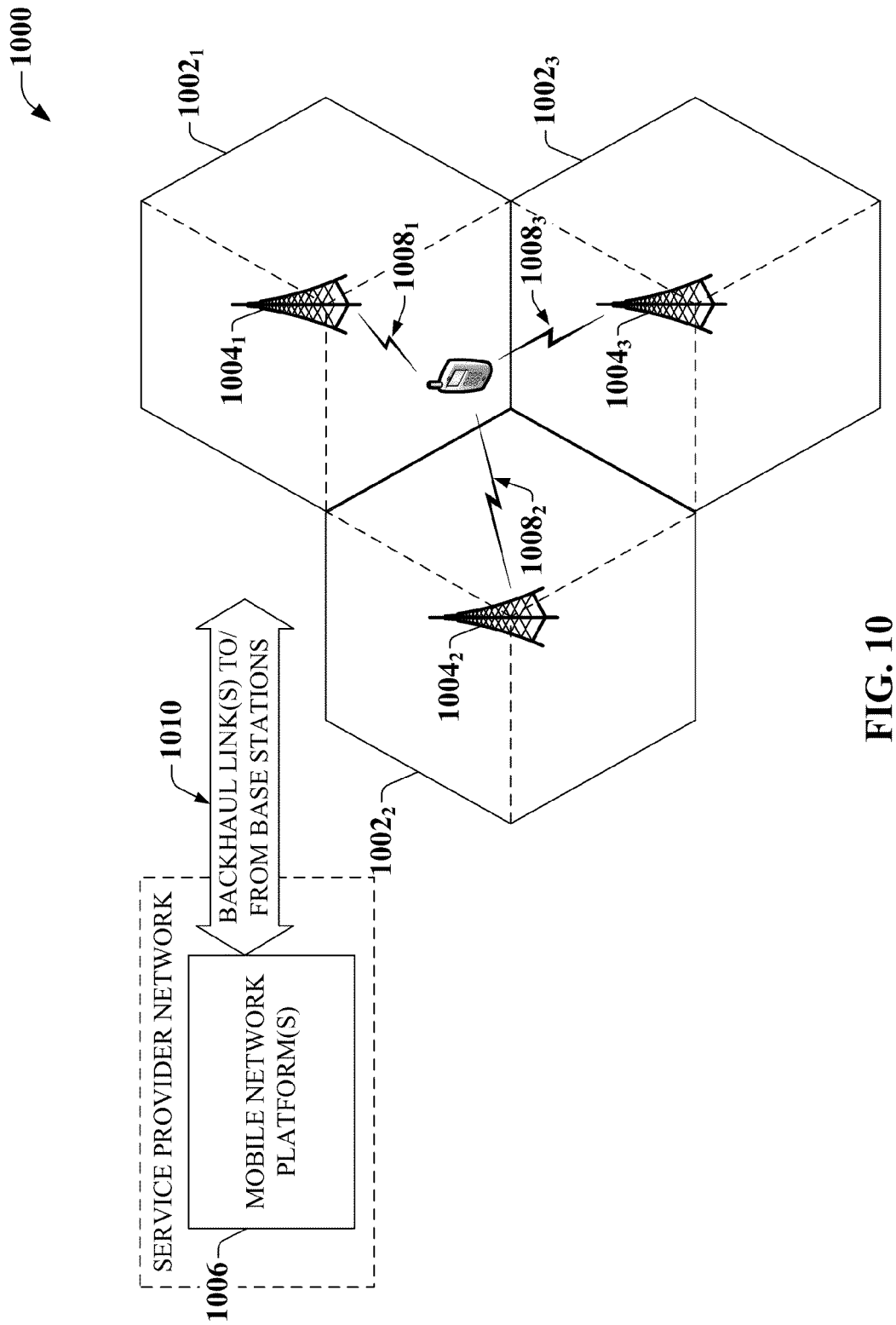
FIG. 10 illustrates a schematic example wireless environment that can operate in accordance with aspects described herein.

FIG. 10 illustrates a schematic example wireless environment 1000 that can operate in accordance with aspects described herein. In particular, example wireless environment 1000 illustrates a set of wireless network macro cells. Three coverage macro cells $1002_1$-$1002_3$ comprise the illustrative wireless environment; however, it should be appreciated that wireless cellular network deployments can encompass any number of macro cells, for example, $10^4$-$10^5$ coverage macro cells. Coverage macro cells $105_\lambda$ ($\lambda$=1, 2, 3) are illustrated as hexagons; however, coverage cells can adopt other geometries generally dictated by a deployment configuration or floor plan, geographic areas to be covered, and so on. Each macro cell $1002_\lambda$ is sectorized in a $2\pi/3$ configuration in which each macro cells includes three sectors, demarcated with dashed lines in FIG. 10. It should be appreciated that other sectorizations are possible, and aspects or features of the disclosed subject matter can be exploited regardless of type of sectorization. Macro cells $1002_1$, $1002_2$, and $1002_3$ are served respectively through NodeB $1004_1$, $1004_2$ and $1004_3$. Any two NodeBs can be considered a NodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1006, and set of base stations (e.g., Node B $1004_n$, with n=1, 2, ...) that serve a set of macro cells; electronic circuitry or components associated with the base stations in the set of base stations; a set of respective wireless links (e.g., links $1008_k$ where k=1, 2, ...) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links $1008_\lambda$ embody a Uu interface (UMTS Air Interface).

Mobile network platform(s) 1006 facilitates circuit switched (CS)-based (e.g., voice and data) and packet-switched (PS) (e.g., Internet Protocol (IP), frame relay, or Asynchronous Transfer Mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider (e.g., Personal Communication Services (PCS), Advanced Wireless Services (AWS), General Wireless Communications Service (GWCS), and so forth), and any unlicensed frequency bands currently available for telecommunication (e.g., the 2.4 GHz Industrial, Medical and Scientific (IP Multimedia Subsystem or IMS) band or one or more of the 5 GHz set of bands). In addition, wireless network platform(s) 1006 can control and manage base stations $1004_\lambda$, and radio component(s) associated thereof, in disparate macro cells $1002_\lambda$ by way of, for example, a wireless network management component (e.g., radio network controller(s), cellular gateway node(s), etc). Moreover, wireless network platform(s) can integrate disparate networks (e.g., femto network(s), Wi-Fi network(s), femto cell network(s), broadband network(s), service network(s), enterprise network(s), ...). In cellular wireless technologies (e.g., 3rd Generation Partnership Project (3GPP) Universal Mobile Telecommunication System (UMTS), Global System for Mobile Communication (GSM)), wireless network platform 1006 is embodied in a core network and a set of radio network controllers.

In addition, wireless backhaul link(s) 1010 can include wired link components, such as T1/E1 phone line; a Digital Subscriber Line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1010 embodies IuB interface.

It should be appreciated that while an example wireless environment 1000 is illustrated for macro cells and macro base stations, aspects, features, and advantages of the disclosed subject matter can be implemented in microcells, picocells, femto cells, or the like, wherein base stations are embodied in home-based access points.

Timing of wireless signals should take into consideration the time from wave signal generation or output at radio equipment a transmitter (e.g., a User Equipment (UE) or NodeB) to detection at a receiver (e.g., a UE or NodeB). Such timing includes site timing through link(s) to antenna(s) and propagation time over the air interface or wireless channel. Timing delay typically is caused by various source, e.g., mismatches among electronic elements and components (e.g., impedance mismatch), stray capacitances and inductances, length of the antenna(s) cable(s) in base station(s); tower height of base station, whereas timing delay spread generally originates from any signal path scattering, or "signal bounces," such as multipath, strong reflections, etc.; and the like. In an aspect of the disclosed subject matter, timing and delay errors can be compensated for where the errors in delay and timing can be determined Wherein better location measurements beget better timing measurements, aspects of the disclosed subject matter can, at least in part, contribute to improved network performance. Similarly, better timing measurements can be employed for better location determination. Further, it is noted that compensation of timing delay can depend on sector coverage, e.g., a first sector can be densely populated while a neighboring sector can include substantial areas of lower population density.

A UE observed time difference, 'C', includes both a cell site timing portion, 'A', and a RF propagation portion, 'B', such that A+B=C. Further, where cell site location and UE location are known, the RF propagation time, B, can be deduced, e.g., B=(distance between UE and cell site/speed of light). Using the deduced RF propagation time, B, and Observed UE time difference, C, the cell site timing, A, can be calculated, as A=C−B. Site timing, A, is relatively stable over periods of hours to days for most modern network equipment. Once A is determined, C can be measured for additional UEs and the RF propagation time (i.e., B) for these additional UEs can be determined by B=C−A. RF propagation time, B, can then be converted into a distance (e.g., B*speed of light=distance) and, using multilateration techniques, UEs positions can be identified.

Determining the values of B by geometry can be facilitated by having a knowledge of the location the NodeB and UE. NodeB locations are typically known with high levels of precision, as these are normally permanent installations. Further, the location of a particular UE can be determined using internal GPS systems (e.g., Assisted GPS (AGPS), usually to within 5-10 meter accuracy). Thus an AGPS enabled UE can facilitate the determination of A, as disclosed herein, such that the location of non-location aware UEs in a macro cell can be calculated, for example, by multilateration. In experiments, these measurements can produce location accuracies for non-location aware UEs with median errors of <70 m in suburban areas. Multilateration incorporates compounding errors. Further, multilateration is also computationally significant (e.g., involves hyperbolic functions between NBSPs at (N−1)!, where N is the number of cell sites, for example, 5 cell sites would involve 24 simultaneous hyperbolic functions.) Timed fingerprint locating (TFL) can reduce computational complexity and provide pre-computed values in lookup tables to facilitate improved location techniques.

Figure 11:
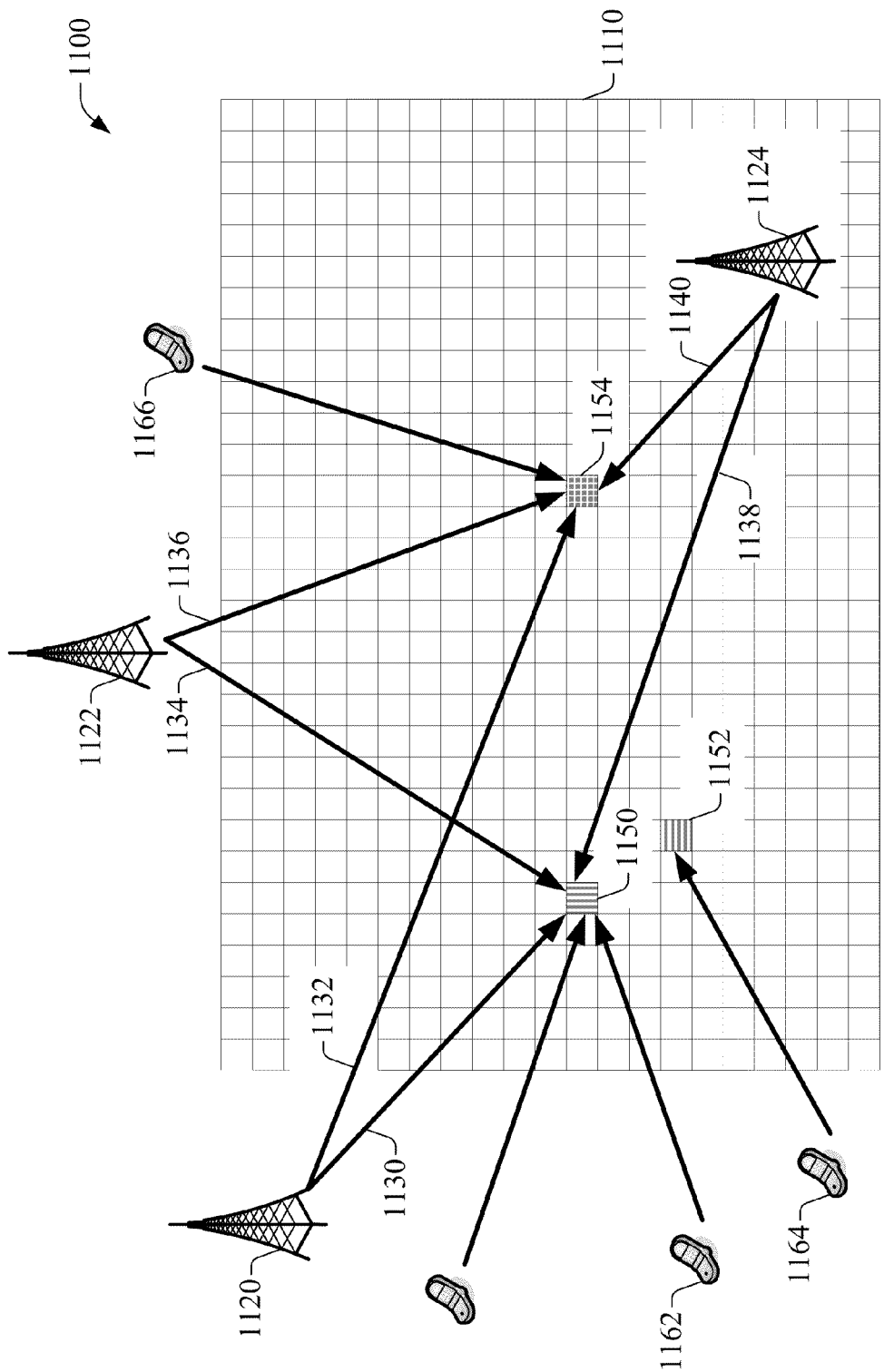
FIG. 11 illustrates a diagram of a subset of wireless devices in a wireless environment, in accordance with aspects of the disclosed subject matter.

FIG. 11 illustrates a diagram of a subset of wireless devices in a mapping timed fingerprint location (TFL) wireless environment 1100, in accordance with aspects of the disclosed subject matter. TFL wireless environment 1100 includes a bin grid 1110 that is a relative coordinate framework which defines a matrix of evenly spaced points referred to interchangeably as bins or frames. The frames can be correlated to a geographic data set, e.g., the bin grid 1110 can provide identifiable regions of a predetermined area related to a mapping of a cell site, NodeB, county, county, etc. It can generally be stated that any UE is in one bin grid 1110 frame at a given time.

Bin grid 1110 frames are of arbitrary size and number. However, for simplicity, bin grid 1110 frame size will be considered to be 100 meters by 100 meters for the purposes of discussion herein, as this closely matches current UMTS chip size (e.g., UMTS chip rate is 3.84 MBit/sec, therefore one chip is roughly 260.42 nsec and 78 meters). Additionally, a bin grid can comprise other bin grids or portions thereof. Moreover, bin grids may overlap wholly or partially and at any orientation. It is further noted that a bin grid can be physically two dimensional (2D) or three dimensional (3D), wherein a 2D grid can, for example, include x,y coordinates (e.g., latitude, longitude) and a 3D grid can add, for example, a z dimension (e.g., height).

TFL wireless environment 1100 can further include one or more NodeB cell base sites 1120, 1122, 1124. These NodeB are typically fixed locations with well-characterized location coordinates such that the distance between a NodeB and any given frame of bin grid 1110 can be easily computed.

Additionally, TFL wireless environment 1100 can include one or more UEs (e.g., mobile phones 1160, 1162, 1164 and 1166). These UEs can include location aware UEs (e.g., AGPS enabled UE) and non-location aware UEs. Wireless interactions with UEs can be correlated to nodes in bin grid 1110. For example, an AGPS enabled UE can determine a latitude and longitude that can be correlated with a bin grid 1110 node encompassing that same latitude and longitude.

Where UE 1160 is a location aware UE (e.g., UE 1160 is AGPS enabled), UE 1160 can make location information available to the TFL wireless environment 1100, for example, through one or more NodeBs (e.g., 1120, 1122, 1124). UE 1160, for instance, can be located at a latitude and longitude within frame 1150 of bin grid 1110 and, for example, can transmit this latitude and longitude location information, which can be received by, for example, NodeB 1120. This latitude and longitude location information can be directly correlated to frame 1150 and also with the RF propagation delay, B, to frame 1150 from some NodeB in TFL wireless environment 1100. For example, where UE 1160 is located in frame 1150, propagation delay 'B' is the distance 1130 between from NodeB 1120 and UE 1160 (located in frame 1150) divided by the speed of light. Thus, the propagation delay 'B' can be directly determined because the location of both the NodeB and the UE are known, as disclosed herein. Further, NodeB 1120 can communicate this location information, propagation delay information, or derivatives thereof, to other equipment associated with the wireless network.

Figure 12:
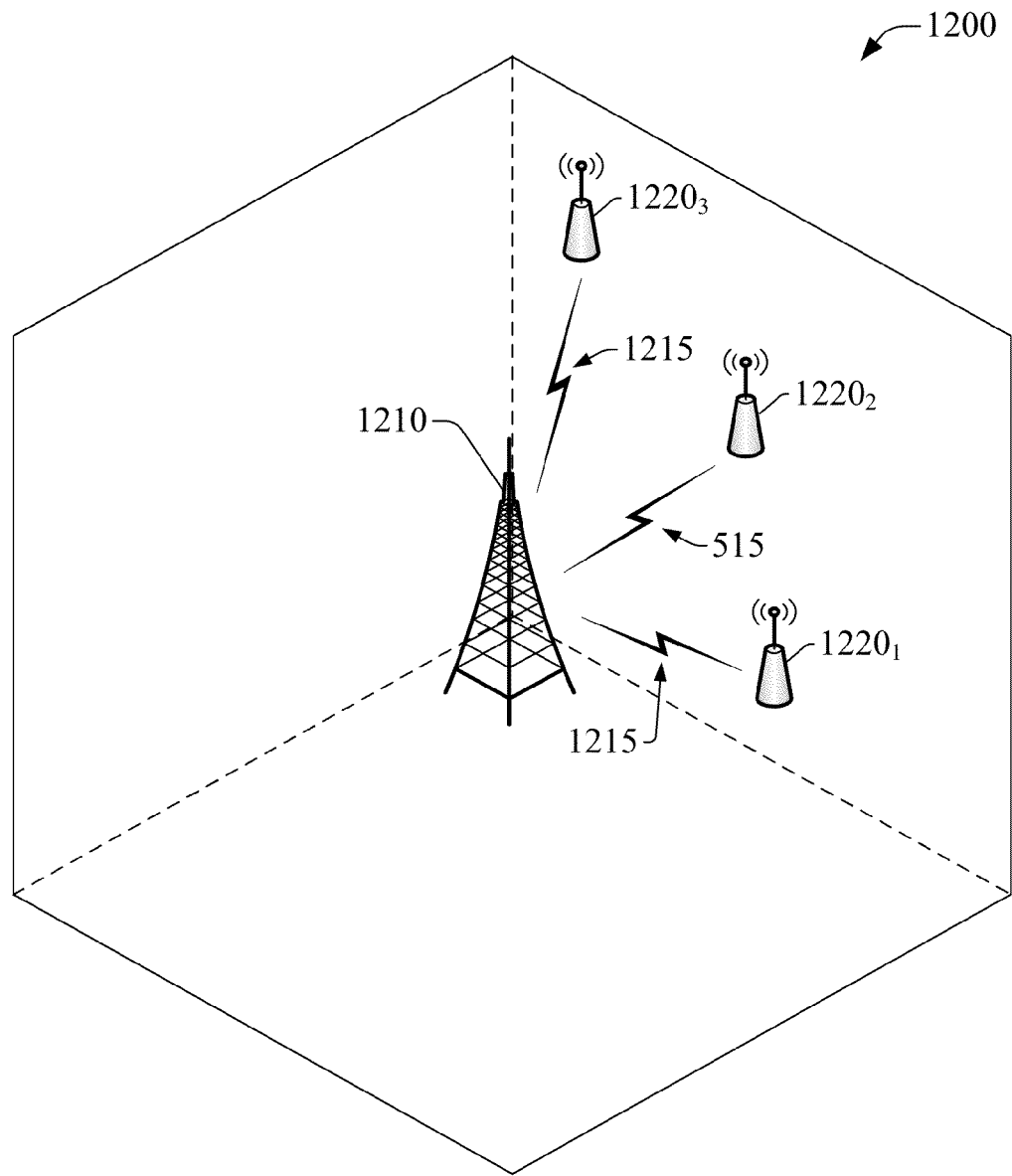
FIG. 12 illustrates additional or alternative timing and/or location data generation components that are not devices to facilitate calibration of reference frames in a bin grid framework.

FIG. 12 illustrates additional or alternative timing and/or location data generation components $1220_1$-$1220_3$ that are not devices (e.g., calibration beacons, femto or pico cell equipment, etc.) to facilitate calibration of reference frames in a bin grid framework. Known locations for a set of probes, or wireless beacons, deployed within a coverage cell or sector, as illustrated, can be employed to determine A and B in a manner similar to a location aware UE. For example, macro coverage cell 1200 is divided in three sectors (demarcated by dashed lines) served by base station 1210, wherein a sector includes a set of three probes $1220_1$-$1220_3$ located at specific positions that are known, or available, to the one or more network components (e.g., mobile network platform(s) 1008). Probes $1220_1$-$1220_3$ also communicate with base station 1210 through wireless links 1215. Communicated time data and a known position of the probes $1220_1$-$1220_3$ allows calculation of various values as disclosed herein. Wireless probes, or beacons, can be stationary or pseudo-stationary. In an example, wireless probes can be Wi-Fi outdoor access points that are part of a public metropolitan network. In another example, wireless probes can be part of wireless-enabled utility equipment (e.g., electric meter(s)) deployed within a utility network, e.g., electric grid. It should be appreciated that wireless beacons embodied in utility meters can be better suited for smaller, urban coverage sectors, since transmission power of such probes can be low compared to power form Wi-Fi access points.

Various aspects of the disclosed subject matter can be automated through artificial intelligence (AI) methods to infer (e.g., reason and draw a conclusion based upon a set of metrics, arguments, or known outcomes in controlled scenarios) suitable models for propagation of wireless signal, e.g., RF signal, microwave signal, etc.; optimal or near-optimal positions for probes that enable generation of accurate location estimates; or the like. Artificial intelligence techniques typically apply advanced mathematical algorithms— e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

Figure 13:
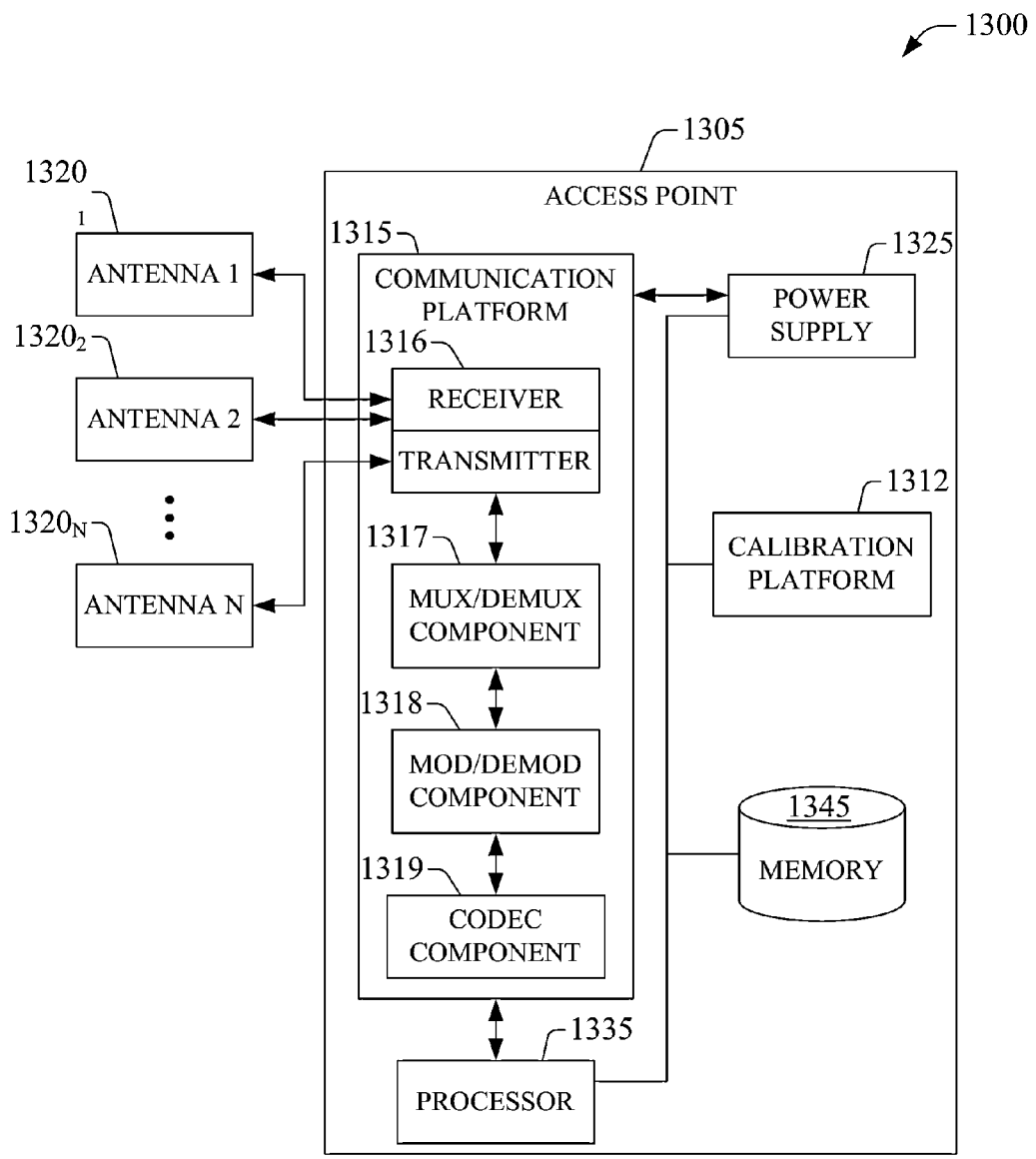
FIG. 13 illustrates a block diagram of an example embodiment of an access point to implement and exploit one or more features or aspects of the disclosed subject matter.

FIG. 13 illustrates a block diagram of an example embodiment of an access point to implement and exploit one or more features or aspects of the disclosed subject matter. In embodiment 1300, access point (AP) 1305 can receive and transmit signal(s) (e.g., attachment signaling) from and to wireless devices like femto access points, access terminals, wireless ports and routers, or the like, through a set of antennas $1320_1$-$1320_N$ (N is a positive integer). It should be appreciated that antennas $1320_1$-$1320_N$ embody antenna(s) 432, and are a part of communication platform 1315, which comprises electronic components and associated circuitry that provides for processing and manipulation of received signal(s) and signal(s) to be transmitted. Such electronic components and circuitry embody at least in part signaling and traffic component 434; communication platform 1315 operates in substantially the same manner as communication platform 430 described hereinbefore. In an aspect, communication platform 1315 includes a receiver/transmitter 1316 that can convert signal (e.g., RL (reverse link) signal 438) from analog to digital upon reception, and from digital to analog upon transmission. In addition, receiver/transmitter 1316 can divide a single data stream into multiple, parallel data streams, or perform the reciprocal operation. Coupled to receiver/transmitter 1316 is a multiplexer/demultiplexer 1317 that facilitates manipulation of signal in time and frequency space. Electronic component 1317 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1317 can scramble and spread information (e.g., codes) according to substantially any code known in the art; e.g., Hadamard-Walsh codes, Baker codes, Kasami codes, polyphase codes, and so on. A modulator/demodulator 1318 is also a part of communication platform 1315, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1315 also includes a coder/decoder (codec) component 1319 that facilitates decoding received signal(s), and coding signal(s) to convey.

Access point 1305 also includes a processor 1335 configured to confer functionality, at least in part, to substantially any electronic component in AP 1305. In particular, processor 1335 can facilitate determination of propagation delay information of RF signal, or microwave signal, among communication platform 1315 and antennas $1320_1$-$1320_N$ in accordance with various aspects and embodiments disclosed herein. Power supply 1325 can attach to a power grid and include one or more transformers to achieve power level that can operate AP 1305 components and circuitry. Additionally, power supply 1325 can include a rechargeable power component to ensure operation when AP 1305 is disconnected from the power grid, or in instances, the power grid is not operating.

Processor 1335 also is functionally connected to communication platform 1315 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1335 is functionally connected, via a data or system bus, to calibration platform 1312 and other components (not shown) to confer, at least in part functionality to each of such components.

In AP 1305, memory 1345 can store data structures, code instructions and program modules, system or device information, code sequences for scrambling, spreading and pilot transmission, location intelligence storage, determined delay offset(s), over-the-air propagation models, and so on. Processor 1335 is coupled to the memory 1345 in order to store and retrieve information necessary to operate and/or confer functionality to communication platform 1315, calibration platform 1312, and other components (not shown) of access point 1305.

Figure 14:
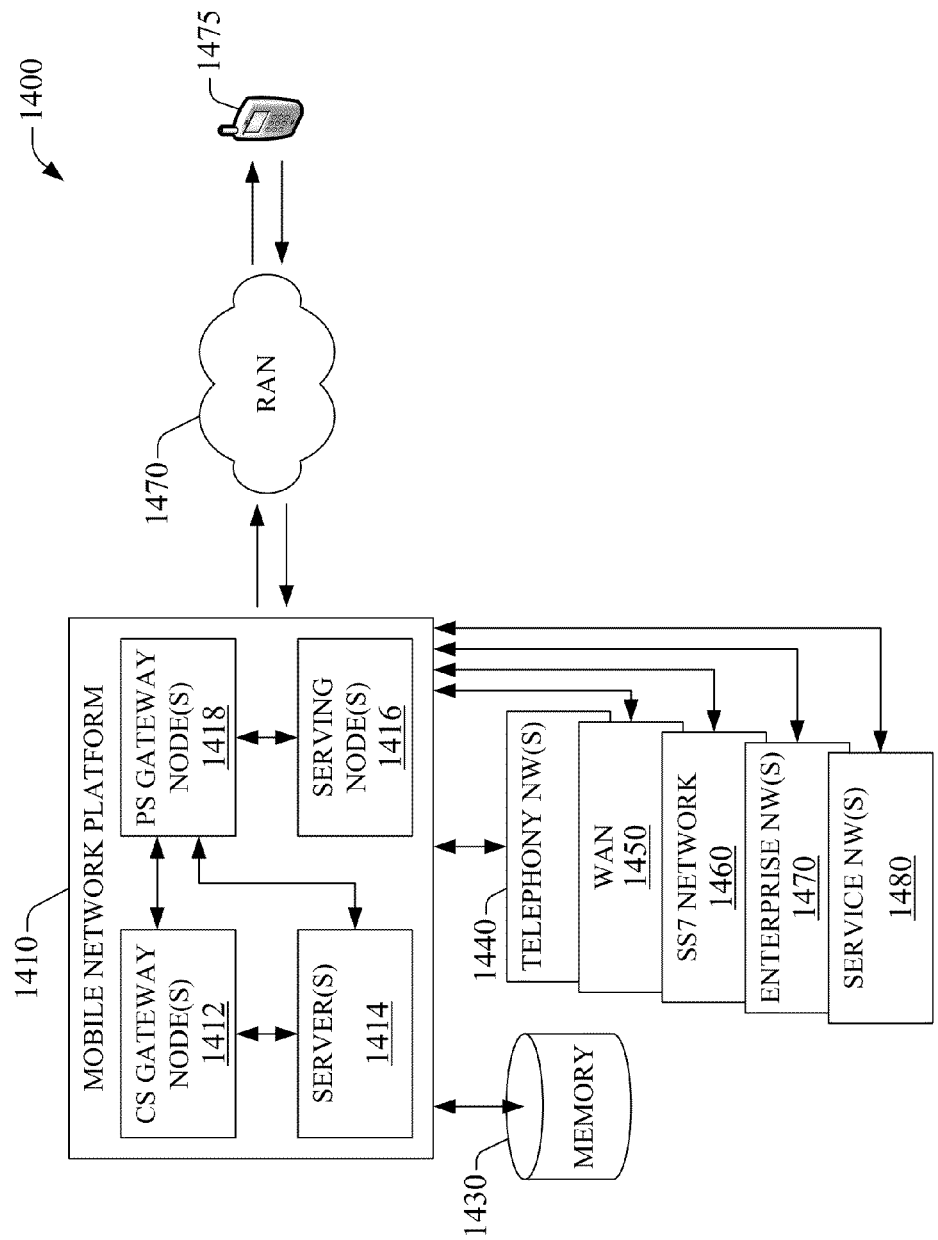
FIG. 14 illustrates an example embodiment of a mobile network platform that can implement and exploit one or more aspects of the disclosed subject matter described herein.

FIG. 14 illustrates an example embodiment 1400 of a mobile network platform 1410 that can implement and exploit one or more aspects of the disclosed subject matter described herein. Generally, wireless network platform 1410 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1410 includes CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412 can authorize and authenticate traffic (e.g., voice) arising from such networks. Additionally, CS gateway node(s) 1412 can access mobility, or roaming, data generated through SS7 network 1470; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS (general packet radio service) support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication.

In the disclosed subject matter, in addition to receiving and processing CS-switched traffic and signaling, PS gateway node(s) 1418 can authorize and authenticate PS-based data sessions with served mobile devices. Data sessions can include traffic, or content(s), exchanged with networks external to the wireless network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1460 can embody, at least in part, a service network(s) like IP multimedia subsystem (IMS). Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also includes serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For radio technologies that exploit packetized communication, server(s) 1414 in wireless network platform 1410 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to wireless network platform 1410 (e.g., deployed and operated by the same service provider), such as femto cell network(s) (not shown) that enhance wireless service coverage within indoor confined spaces and offload RAN resources in order to enhance subscriber service experience within a home or business environment.

It is to be noted that server(s) 1414 can include one or more processors configured to confer at least in part the functionality of macro network platform 1410. To that end, the one or more processor can execute code instructions stored in memory 1430, for example. It is should be appreciated that server(s) 1414 can include a content manager 1415, which operates in substantially the same manner as described hereinbefore.

In example embodiment 1400, memory 1430 can store information related to operation of wireless network platform 1410. Other operational information can include provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, enterprise network(s) 1460, or SS7 network 1470.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN (Universal Terrestrial Radio Access Network), LTE Advanced, Zigbee, or other IEEE 802.XX technology. Additionally, substantially all aspects disclosed herein can be exploited in legacy telecommunication technologies; e.g., GSM. In addition, mobile as well non-mobile networks (e.g., Internet, data service network such as IPTV (IP Television)) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
    determining, by a system comprising a processor, a first route and a second route as a function of a travel time target that represents a determined amount of time to be traveled in relation to a first location, wherein the determining comprises:
        associating a first set of route segments with the first route and a second set of route segments with the second route, and
        determining respective transit times and associated confidence levels for the first set of route segments and the second set of route segments based on current information and historical information associated with the first and second sets of route segments;
    deriving a second location based on the first route and the travel time target and a third location based on the second route and the travel time target; and
    initiating, by the system, a rendering of a map that comprises an indication of the second location, the third location, a first confidence level that indicates a confidence of arrival at the second location within the travel time target, and a second confidence level that indicates another confidence of arrival at the third location within the travel time target.

2. The method of claim 1, further comprising receiving, by the system, a start location as the first location, wherein the deriving comprises determining the second location and the third location as alternative destination locations based on the travel time target, and wherein the initiating the rendering comprises initiating a display of the alternative destination locations.

3. The method of claim 1, further comprising receiving, by the system, a destination location as the first location, wherein the deriving comprises determining the second location and the third location as alternative start locations based on the travel time target, and wherein the initiating the rendering comprises initiating a display of the alternative start locations.

4. The method of claim 1, further comprising:
    receiving, by the system, a travel start time; and
    associating, by the system, a day of a week and a time of day with the travel start time, wherein the determining the respective transit times and associated confidence levels comprises using the current information for a first portion of the first set of route segments and a second portion of the second set of route segments in response to the travel start time being determined to be within a determined time of a current time and using the historical information related to the day and the time of day in response to the travel start time being determined not to be within the determined time of the current time to derive the second location and the third location.

5. The method of claim 1,
    wherein the first confidence level and the second confidence level are represented as ranked numbers.

6. The method of claim 1, wherein the initiating the rendering comprises initiating a display of colors that indicate a first distance to be traveled from the first location to the second location and a second distance to be traveled from the first location to the third location, and wherein the first distance and the second distance are different distances.

7. The method of claim 1, further comprising:
    collecting, by the system, data associated with route segments of the first route and the second route; and
    including, by the system, the data in the historical information.

8. The method of claim 1, wherein the first and second sets of route segments comprise a minimum distance defined between two geographic markers.

9. The method of claim 1, wherein the first and second sets of route segments comprise different distances.

10. The method of claim 1, further comprising determining, by the system, speed estimates for the first and second sets of route segments based on an average speed determined based on sensor information received from sensors over a defined time period.

11. The method of claim 1, further comprising:
dividing, by the system, the first route into the first set of route segments based on a set of known location markers;
determining, by the system for the first set of route segments, respective expected travel times based on a subset of the current information associated with a first subset of the first set of route segments and a subset of the historical information associated with a second subset of the first set of route segments;
dividing, by the system, the second route into the second set of route segments based on another set of known location markers; and
determining, by the system for the second set of route segments, respective expected travel times, wherein the respective expected travel times are based on other current information associated with a third subset of the second set of route segments and other historical information associated with a fourth subset of the second set of route segments.

12. A system, comprising:
a processor; and
a memory that stores executable instructions that, when executed by the processor, cause performance of operations, comprising:
determining, based on a travel time target that defines a bound on an amount of time to be traveled in relation to a first location, a first route and a second route, comprising:
determining that the first route comprises a first set of route segments and the second route comprises a second set of route segments,
determining a first set of transit times associated with the first set of route segments and a second set of transit times associated with the second set of route segments based on current information and historical information associated with the first and second sets of route segments, and
determining a first set of confidence levels for the first set of transit times and a second set of confidence levels for the second set of transit times;
determining a second location based on the first set of transit times and the first set of confidence levels and a third location based on the second set of transit times and the second set of confidence levels; and
outputting the first location, the second location, the third location, a first confidence level that indicates a confidence of arrival at the second location within the travel time target, and a second confidence level that indicates another confidence of arrival at the third location within the travel time target on a map.

13. The system of claim 12, wherein the operations further comprise outputting the first set of confidence levels and the second set of confidence levels as respective number ranks.

14. The system of claim 12, wherein the operations further comprise outputting the first set of confidence levels and the second set of confidence levels as letter grades.

15. The system of claim 12, wherein the operations further comprise:
dividing the first route into the first set of route segments based on a set of known location markers measured with respect to geographic locations;
determining, for the first set of route segments, respective expected travel times based on a subset of the current information associated with a first subset of the first set of route segments and a subset of the historical information associated with a second subset of the first set of route segments;
dividing the second route into the second set of route segments based on another set of known location markers with respect to other geographic locations; and
determining, for the second set of route segments, respective expected travel times, wherein the respective expected travel times are based on other current information associated with a third subset of the second set of route segments and other historical information associated with a fourth subset of the second set of route segments.

16. The system of claim 15, wherein the operations further comprise
receiving a travel start time; and
associating a day of a week and a time of day with the travel start time, wherein the determining the first and second sets of transit times comprises, to derive the second location and the third location, using the current information for the first subset and the third subset in response to the travel start time being determined to be within a determined time of a current time and using the historical information related to the day and the time of day in response to the travel start time being determined not to be within the determined time of the current time.

17. A non-transitory computer-readable storage device storing executable instructions that, in response to execution, cause a system comprising a processor to perform operations, comprising:
determining a first route and a second route as a function of a first location and a travel time target that represents a determined amount of time to be traveled in relation to the first location, wherein the determining comprises:
dividing the first route into a first set of route segments based on a set of known location markers,
determining, for the first set of route segments, respective expected travel times based on current information associated with a first subset of the first set of route segments and historical information associated with a second subset of the first set of route segments,
dividing the second route into a second set of route segments based on another set of known location markers, and
determining, for the second set of route segments, respective expected travel times, wherein the respective expected travel times are based on other current information associated with a third subset of the second set of route segments and other historical information associated with a fourth subset of the second set of route segments;
deriving a second location based on the first route and a third location based on the second route; and
rendering of a map on a display device, wherein the rendering comprises the second location and a first confidence level that indicates whether the second location is capable of being traversed within the travel time target, and the third location and a second confidence level that indicates whether the third location is capable of being traversed within the travel time target.

18. The non-transitory computer-readable storage device of claim 17, wherein the operations further comprise:
receiving a travel start time; and
associating a day of a week and a time of day with the travel start time, wherein the determining comprises using the current information for the first subset and the third subset in response to the travel start time being determined to be within a determined time of a current time and using the historical information related to the day and the time of day in response to the travel start time being determined not to be within the determined time of the current time to derive the second location and the third location.

19. The non-transitory computer-readable storage device of claim 17, wherein the operations further comprise:
receiving a start location as the first location; and
determining the second location and the third location as alternative destination locations based on the travel time target, wherein the rendering comprises a display of the alternative destination locations on the display device.

20. The non-transitory computer-readable storage device of claim 17, wherein the operations further comprise:
receiving a destination location as the first location; and
determining the second location and the third location as alternative start locations based on the travel time target, wherein the rendering comprises a display of the alternative start locations on the display device.

* * * * *